US005922118A

United States Patent [19]
Johnson et al.

[11] Patent Number: 5,922,118
[45] Date of Patent: *Jul. 13, 1999

[54] MODIFIED COLORED PIGMENTS AND INK JET INKS, INKS, AND COATINGS CONTAINING MODIFIED COLORED PIGMENTS

[75] Inventors: Joseph E. Johnson, Nashua, N.H.; James A. Belmont, Acton, Mass.

[73] Assignee: Cabot Corporation, Boston, Mass.

[*] Notice: This patent is subject to a terminal disclaimer.

[21] Appl. No.: 08/871,453

[22] Filed: Jun. 9, 1997

Related U.S. Application Data

[63] Continuation-in-part of application No. 08/663,707, Jun. 14, 1996, Pat. No. 5,707,432, and application No. 08/783,411, Jan. 14, 1997, Pat. No. 5,803,959.

[51] Int. Cl.⁶ .................................................. C09D 11/02
[52] U.S. Cl. .................. 106/31.6; 106/31.75; 106/31.86; 106/476; 106/499
[58] Field of Search ............................ 106/31.75, 31.86, 106/31.6, 476, 499

[56] References Cited

U.S. PATENT DOCUMENTS

| | | | |
|---|---|---|---|
| T860,001 | 3/1969 | Gessler | 260/41.5 |
| 2,121,535 | 6/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon | 106/30 R |
| 3,025,259 | 3/1962 | Watson et al. | 106/476 |
| 3,317,458 | 5/1967 | Clas et al. | 260/41.5 |

(List continued on next page.)

FOREIGN PATENT DOCUMENTS

| | | |
|---|---|---|
| 0 006 190 A1 | 1/1980 | European Pat. Off. . |
| 0 475 075 A1 | 3/1992 | European Pat. Off. . |
| 0 050 354 | 4/1992 | European Pat. Off. . |
| E 72775 | 4/1960 | France . |
| 1331889 | 5/1963 | France . |
| 1948443 | 4/1971 | Germany . |
| 23 55 758 | 5/1975 | Germany . |
| 56-078629 | 6/1981 | Japan . |
| 59/82467 | 5/1984 | Japan . |
| 62/250073 | 10/1987 | Japan . |
| 6067421 | 3/1994 | Japan . |
| 862018 | 3/1961 | United Kingdom . |
| 1191872 | 5/1970 | United Kingdom . |
| 2 188 311 | 9/1987 | United Kingdom . |
| WO 91/02034 | 2/1991 | WIPO . |
| WO 91/15425 | 10/1991 | WIPO . |
| WO 92/13983 | 8/1992 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Derwent Abstract, AN No. 88–116672, "Surface Treat of Carbon Black Powder Coating Disperse Water Adjust pH Add Aqueous Solution Sodium Silicate," Mar. 22, 1988, JP 63063755 A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

*Primary Examiner*—Helene Klemanski

[57] ABSTRACT

A modified colored pigment is described which comprises colored pigment having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the pigment and the organic group is present at a treatment level of from about 0.10 to about 4.0 micromoles/m² of the pigment used based on nitrogen surface area of the pigment. Also described are aqueous and non-aqueous inks and coatings and ink jet ink compositions containing the modified colored pigment. A method to increase the flow of an ink is also disclosed as well as a method to improve the waterfastness of a print imaged by an ink composition. Also, other ink jet ink compositions are described which comprise an aqueous or non-aqueous vehicle and a colored pigment having attached an organic group having the formula: Ar—$R^1$ (I) or Ar'$R^3R^2$ (II) wherein Ar is an aromatic group and Ar' is an aromatic group.

77 Claims, No Drawings

U.S. PATENT DOCUMENTS

| | | | |
|---|---|---|---|
| 3,335,020 | 8/1967 | Aboytes et al. | 106/476 |
| 3,423,391 | 1/1969 | Kindler et al. | 260/141 |
| 3,528,840 | 9/1970 | Aboytes | 106/473 |
| 3,671,476 | 6/1972 | Terai et al. | 260/23 |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,265,768 | 5/1981 | Beasley et al. | 210/682 |
| 4,320,011 | 3/1982 | Sato et al. | 210/694 |
| 4,366,139 | 12/1982 | Kühner et al. | 423/449 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,597,794 | 7/1986 | Ohta et al. | 106/20 C |
| 4,820,751 | 4/1989 | Takeshita et al. | 523/215 |
| 4,831,011 | 5/1989 | Oikawa et al. | 502/406 |
| 5,130,363 | 7/1992 | Scholl et al. | 524/392 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,281,261 | 1/1994 | Lin | 106/20 R |
| 5,282,887 | 2/1994 | Gay et al. | 106/261 |
| 5,401,313 | 3/1995 | Supplee et al. | 106/475 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,630,868 | 5/1997 | Belmont et al. | 106/31.75 |
| 5,637,138 | 6/1997 | Yamazaki | 106/31.32 |
| 5,654,357 | 8/1997 | Menashi et al. | 524/495 |
| 5,656,072 | 8/1997 | Kato et al. | 106/31.58 |
| 5,672,198 | 9/1997 | Belmont | 106/20 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |
| 5,747,562 | 5/1998 | Mahmud et al. | 106/475 |
| 5,749,950 | 5/1998 | Mahmud et al. | 106/31.6 |
| 5,803,959 | 9/1998 | Johnson et al. | 106/31.75 |

MODIFIED COLORED PIGMENTS AND INK JET INKS, INKS, AND COATINGS CONTAINING MODIFIED COLORED PIGMENTS

This application is a continuation-in-part of U.S. patent application Ser. No. 08/663,707, filed Jun. 14, 1996, now U.S. Pat. No. 5,707,432, and Ser. No. 08/783,411, filed Jan. 14, 1997, now U.S. Pat. No. 5,803,959, which are incorporated in their entirety by reference herein.

BACKGROUND OF THE INVENTION

1. Field of the Invention

This invention relates to modified colored pigments, such as modified carbon products, and ink jet inks, inks and coatings which contain modified colored pigments. The present invention is further directed to ink compositions and, more particularly, to aqueous ink compositions suitable for imaging applications, such as ink jet printing processes.

2. Discussion of the Related Art

Presently, predominant black pigments are carbon blacks which can be used as colorants either in dry, powdered form, a flushed paste, or a liquid dispersion form depending upon the method to apply the pigment to the substrate and the substrate requirements. Generally, physical and surface properties of the colorant influences the hue, permanency, bulk, opacity, gloss, rheology, end use, and print quality.

There are various classifications of inks used presently. These categories include printing inks, ultraviolet cure inks, ball-point inks, and stamp pad or marking inks. Generally, inks can be applied by letter press, lithographic, flexographic, gravure, silk screen, stencil, duplicating, and electrostatic. Inks thus can be found in such end uses as news, publication, commercial, folding carton, book, corrugated box, paper bag, wrapper, label, metal container, plastic container, plastic film, foil, laminating, food insert, sanitary paper, textile and the like. McGraw-Hill's *Encyclopedia of Science and Technology*, Vol. 7, pgs. 159–164, provides further details of the types of inks available and their uses, all of which is incorporated herein by reference.

Coatings can contain pigments as well and are used for decorative, protective, and functional treatments of many kinds of surfaces. These surfaces include, coils, metals, appliances, furniture, hardboard, lumber and plywood, marine, maintenance, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on waveguide fibers for signal transmission, and magnetic coatings on video tapes and computer disks are among many so-called hi-tech applications for coatings.

Categories of aqueous vehicles for aqueous inks and coatings include those in which the binder is soluble in water, those in which it is colloidally dispersed, and those in which it is emulsified to form a latex. The combination of binder and volatile liquid is called the vehicle which may be a solution or a dispersion of fine binder particles in a non-solvent. Pigments are finely divided, insoluble, solid particles dispersed in the coating vehicle and distributed throughout the binder in the final film. Surfactants or polymers can be used as pigment dispersants. The components and manufacturing of aqueous coatings are further discussed in the *Concise Encyclopedia of Polymers, Science and Engineering*, pgs. 160–171 (1990), which is incorporated herein by reference.

Non-aqueous inks and coatings are used for many applications in which aqueous vehicles are not suitable. For instance, inks which are to be printed on hydrophobic, non-porous substrates such as metal, glass, or plastics must be fast-drying. Therefore, solvents such as ketones, esters, alcohols, or hydrocarbons are often used instead of water. Such solvent-based inks are used widely for industrial labeling of cardboard boxes and various metal or plastic containers and components. Specific examples include news ink compositions and web off-set gloss heat-set ink compositions.

Inks and coatings are also required to be water resistant in certain situations. In such instances, water-resistant resins can be dissolved in non-aqueous solvents of ink and coating formulations to provide the desired water resistance upon drying. A primary use of such non-aqueous coatings is on metal and plastic automotive parts.

Ink jet printing is a non-impact process wherein droplets of ink are produced and deposited on a substrate such as paper, transparent film, polymer sheet, or textile material in response to an electronic signal. Ink jet printing systems are typically classified by two known types: continuous stream or drop-on-demand.

Ink compositions which are useful in imaging applications, such as ink jet ink printing systems, are well known and generally contain water soluble dyes. Although dye-based inks are suitable for their intended purposes, dyes have several disadvantages when used in ink jet inks. For examples, dyes, being water-soluble in a water/organic mixture, may dissolve and run when exposed to moisture or water. Dye images may further smear or rub off on contact with felt pen markers or upon being rubbed or touched by finger. Dyes also exhibit poor light stability when exposed to visible, ultraviolet light, or sunlight.

Pigments are also known as colorants in ink compositions but have not received a wide degree of acceptance in ink jet ink systems, for example, because of problems associated with the performance and reliability of the composition, i.e., print properties, stability, latency, and the like.

As a result, although known compositions are suitable for their intended purpose, a need remains for improved ink compositions, especially for use in the ink jet printers, which overcome the problems typically associated with current dye-based and pigment systems. In addition, there is a need for improved ink compositions providing good print properties and generating printed images having improved water-fastness.

SUMMARY OF THE INVENTION

The present invention relates to a modified colored pigment, such as a modified carbon product, comprising a pigment, like carbon black, having attached at least one organic group. The organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group is directly attached to the colored pigment (e.g. carbon black) and the organic group is present at a treatment level of from about 0.10 to about 4.0 micromoles/m$^2$ colored pigment.

The present invention also relates to a coating or ink composition, aqueous or non-aqueous, comprising the above-described modified colored pigment (e.g. modified carbon black product). The present invention in addition relates to ink jet ink compositions comprising the above-described modified colored pigment (e.g. modified carbon black product).

In addition, the present invention relates to an ink jet ink composition comprising an aqueous or nonaqueous vehicle and a colored pigment having attached an organic group having the formula: Ar—$R^1$ (I) or Ar'$R^3R^2$ (II) wherein Ar is an aromatic group and Ar' is an aromatic group. As shown in formula (I), Ar is substituted with at least one group $R^1$. As shown in formula (II), Ar' is substituted with at least one group $R^2$ and at least one group $R^3$. $R^1$ is an aromatic or aliphatic group containing a hydrophobic group and at least one hydrophilic group. $R^2$ is a hydrophilic group and $R^3$ is an aromatic or aliphatic group containing a hydrophobic group. The organic group is present at a treatment level of from about 0.10 micromoles/$m^2$ colored pigment to about 5.0 micromoles/$m^2$ colored pigment, and the image generated from the ink jet ink composition is waterfast. The present invention also relates to methods to improve the waterfastness of an image generated by an ink jet ink composition by introducing the above-described modified colored pigment into an ink jet ink composition.

The present invention further relates to a non-aqueous coating or ink composition comprising a modified colored pigment (e.g. modified carbon black product) and a non-aqueous solvent. The modified colored pigment (e.g. modified carbon black product) comprises colored pigment (e.g., carbon black) having attached at least one organic group wherein the organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group is directly attached to the colored pigment (e.g., carbon black) and there is no limit on the amount of organic group that can be present.

Colored pigment, as used herein, is any pigment which can be modified with the attachment of at least one organic group. Examples include, but are not limited to, carbon black, and colored pigments other than carbon, having no primary amines, and preferably, at least one aromatic ring in its repeating structure or at its surface to promote the modification of the organic group to the surface of the pigment. A wide range of conventional colored pigments may be used in the present invention provided that such pigments do not possess a primary amine. The colored pigment can be blue, brown, cyan, green, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyrathrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138. Examples of other suitable colored pigments are described in *Colour Index,* 3rd edition (The Society of Dyers and Cikiyrusts, 1982), incorporated herein by reference.

Carbon, as used herein, may be of the crystalline or amorphous type. Examples include, but are not limited to, graphite, carbon black, carbon fiber, vitreous carbon, and activated charcoal or activated carbon. Finely divided forms of the above are preferred. Also, it is possible to utilize mixtures of different colored pigments including mixtures of different carbon blacks.

DESCRIPTION OF THE PREFERRED EMBODIMENTS

The modified colored pigment (e.g. modified carbon black product) of the present invention comprises colored pigment (e.g. carbon black) having attached thereto at least one organic group. This organic group comprises a) at least one aromatic group or a $C_1$–$C_{12}$ alkyl group and b) at least one ionic group, at least one ionizable group, or a mixture of an ionic group and an ionizable group. The aromatic group or the $C_1$–$C_{12}$ alkyl group of the organic group is directly attached to the colored pigment (e.g. carbon black). Further, the organic group is present at a treatment level of from about 0.10 to about 4.0 micromoles/$m^2$ colored pigment. Treatment level, as used herein, is the amount of organic group added to the pigment during the process to form the modified colored pigment. The amount added may be more than the amount of organic group actually attached onto the pigment.

The colored pigment is any pigment which can be modified with the attachment of at least one organic group. Examples include, but are not limited to, carbon black, and colored pigments other than carbon having no primary amines and, preferably, at least one aromatic ring in its repeating structure or at its surface to promote the modification of the organic group to the surface of the pigment. A wide range of conventional colored pigments may be used in the present invention provided that such pigments do not possess a primary amine. The colored pigment can be blue, brown, cyan, green, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio) indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyrathrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138. Examples of other suitable colored pigments are described in *Colour Index,* 3rd edition (The Society of Dyers and Cikiyrusts, 1982). The carbon may be of the crystalline or amorphous type. Examples include, but are not limited to, graphite, carbon black, vitreous carbon, activated charcoal, carbon fiber, activated carbon, and mixtures thereof. Finely divided forms of the above are preferred. Also, it is possible to utilize mixtures of different colored pigments, including mixtures of different carbons.

The modified colored pigments (e.g. modified carbon black products) may be prepared preferably by reacting a colored pigment, such as carbon black, with a diazonium salt in a liquid reaction medium to attach at least one organic group to the surface of the colored pigment. The diazonium salt may contain the organic group to be attached to the colored pigment. A diazonium salt is an organic compound having one or more diazonium groups. Reaction media include polar media. Preferred reaction media include water, any medium containing water, and any medium containing alcohol. Water is the most preferred medium. Examples of modified carbon products, wherein the carbon is carbon black, and various preferred methods for their preparation are described in U.S. patent application Ser. No. 08/356,660 entitled "Reaction of Carbon Black with Diazonium Salts, Resultant Carbon Black Products and Their Uses," filed Dec. 15, 1994 and its continuation-in-part application, U.S. patent application Ser. No. 08/572,525, filed Dec. 14, 1995, both of which are incorporated herein by reference. Examples of modified carbon products, wherein the carbon is not carbon black, and various preferred methods for their preparation are described in U.S. Pat. No. 5,554,739, WO 96/18696 and WO 96/18688, all incorporated herein by reference.

In the preferred preparation of the above modified colored pigments, (e.g., modified carbon products), the diazonium salt need only be sufficiently stable to allow reaction with the colored pigments. Thus, that reaction can be carried out with some diazonium salts otherwise considered to be unstable and subject to decomposition. Some decomposition processes may compete with the reaction between the colored pigment, such as carbon and the diazonium salt and may reduce the total number of organic groups attached to the colored pigment (e.g., carbon black). Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The diazonium salts may be prepared in situ. It is preferred that the modified colored pigments (e.g. modified carbon products) of the present invention contain no by-products or unattached salts.

In the preferred process of preparation, a colored pigment, such as carbon black, can be reacted with a diazonium salt when present as a dilute, easily stirred, aqueous slurry, or in the presence of the proper amount of water for carbon black pellet formation. If desired, carbon black pellets may be formed utilizing a conventional pelletizing technology. Other colored pigments, such as other carbons, can be similarly reacted with the diazonium salt. In addition, when modified colored pigments utilizing carbon other than carbon black or other pigments are, for instance, used in non-aqueous inks and coatings, the carbon or other pigment should preferably be ground to a fine particle size before reaction with the diazonium salt in the preferred process to prevent unwanted precipitation of the modified colored pigment in the inks and coatings. In addition, when modified colored pigments utilizing carbon other than carbon black or other pigments are used in ink jet inks, the carbon or other pigment should preferably be ground to a fine particle size before or after the reaction with the diazonium salt in the preferred process to prevent unwanted sedimentation in the ink. An additional means of stabilization of the particles may be necessary in ink jet inks when the amounts of organic groups on the pigment are not sufficient to provide colloidal stability. One such means can be the use of a dispersant.

For purposes of one embodiment of the present invention, the amount of organic group attached to the colored pigment (e.g. carbon black) is important for purposes of the subsequent use of the modified colored pigment in such applications as ink jet ink compositions, coating formulations, and ink systems. In particular, the levels should be of a low level. In other words, the treatment levels of organic group may be from about 0.10 to about 4.0 micromoles/m$^2$ of the colored pigment (e.g. carbon black) used, preferably from about 1.5 to about 3.0 micromoles/m$^2$ based on nitrogen surface area of the colored pigment.

It was commonly believed that the higher the amount of organic group attached to the carbon, the better the properties. However, in certain situations, attaching low levels of organic groups to colored pigments, such as carbon black, results in better properties. These better properties have been seen, for instance, with the use of the modified colored pigments, such as modified carbon products, of the present invention in non-aqueous applications such as non-aqueous ink and coating systems including non-aqueous gloss ink systems and non-aqueous coating formulations. When the modified colored pigments, such as the modified carbon products, of the present invention have been used in these systems and formulations, improved jetness, blue undertone, and gloss have been achieved and in certain situations, the rheology of the ink, as measured by the Laray viscosity, spreadometer values, and vertical glass plate flow properties have been modified. In some ink formulations, flow was increased considerably over that of untreated carbon products. In addition, in some ink formulations, such as ink jet ink, improved waterfastness of the printed image was achieved.

As stated earlier, in one embodiment, the organic group comprises an aromatic group or a $C_1$–$C_{12}$ alkyl group. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like). The $C_1$–$C_{12}$ alkyl group may be branched or unbranched and is preferably ethyl.

An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, can include groups derived from organic acids. Preferably, when the organic group contains an ionizable group forming an anion, the organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. The naphthyl group may be mono-substituted with an acidic group on either ring. The naphthyl group may also be substituted with two or more acidic groups, with the acidic groups on the same or different rings. Examples of ionic or ionizable groups include —COOH, —SO$_3$H and —PO$_3$H$_2$, —SO$_2$NHCOR, and their salts, for example —COONa, —COOK, —COO$^-$NR$_4^+$, —SO$_3$Na, —HPO$_3$Na, —SO$_3^-$NR$_4^+$, and PO$_3$Na$_2$, where R is a saturated or unsaturated alkyl or phenyl group. Particularly preferred ionizable substituents are —COOH and —SO$_3$H and their sodium and potassium salts.

Accordingly, it is preferred that the colored pigment, such as carbon, is treated with aryl diazonium salts containing at least one acidic functional group. Examples of aryl diazonium salts include, but are not limited to, those prepared from sulfanilic acid, 4-aminobenzoic acid, 4-amino salicylic acid, 7-amino-4-hydroxy-2-naphthlenesulfonic acid, aminophenylboronic acid, aminophenylphosphonic acid, 4-aminophthalic acid, 2-amino-1-naphthalenesulfonic acid, 5-amino-2-naphthalenesulfonic acid, and metanilic acid.

The organic group can be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. One example of a sulfophenyl group is hydroxysulfophenyl group or a salt thereof.

Specific organic groups having an ionizable functional group forming an anion are p-sulfophenyl and 4-hydroxy-3-sulfophenyl.

Amines represent examples of ionizable functional groups that form cationic groups and can be attached to the same organic groups as discussed above for the ionizable groups which form anions. For example, amines may be protonated to form ammonium groups in acidic media. Preferably, an organic group having an amine substituent has a pKb of less than 5. Quaternary ammonium groups (—NR$_3^+$) and quaternary phosphonium groups (—PR$_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. Quaternized cyclic amines, and quaternized aromatic amines, can also be used as the organic group. Thus, N-substituted pyridinium compounds, such as N-methyl-pyridyl, can be used in this regard. Examples of organic groups include, but are not limited to, 3-C$_5$H$_4$N(C$_2$H$_5$)$^+$X$^-$, C$_6$H$_4$NC$_5$H$_5^+$X$^-$, C$_6$H$_4$COCH$_2$N(CH)$_3)_3^+$X$^-$, C$_6$H$_4$COCH$_2$(NC$_5$H$_5$)$^+$X$^-$, 3-C$_5$H$_4$N(CH$_3$)$^+$X$^-$, C$_6$H$_4$N(CH$_3$)$_3^+$X$^-$, and C$_6$H$_4$CH$_2$N(CH$_3$)$_3^+$X$^-$, wherein X$^-$ is a halide or an anion derived from a mineral or organic acid. Other examples include pC$_6$H$_4$—SO$_3^-$Na$^+$, pC$_6$H$_4$—CO$_2^-$Na$^+$, and C$_5$H$_4$N$^+$C$_6$H$_5$(NO$_3$)$^-$.

Additional optional functional groups which may be present on the organic group include, but are not limited to, R, OR, COR, COOR, OCOR, halogen, CN, NR$_2$, SO$_2$NR (COR), SO$_2$NR$_2$, NR(COR), CONR$_2$, NO$_2$, SO$_3$M, SO$_3$NR$_4$, and N=NR'. R is independently hydrogen, C$_1$–C$_{20}$ substituted or unsubstituted alkyl (branched or unbranched), C$_3$–C$_{20}$ substituted or unsubstituted alkenyl, (C$_2$–C$_4$ alkyleneoxy)$_x$R", or a substituted or unsubstituted aryl. R' is independently hydrogen, C$_1$–C$_{20}$ substituted or unsubstituted alkyl (branched or unbranched), or a substituted or unsubstituted aryl. R" is hydrogen, a C$_1$–C$_{20}$ to substituted or unsubstituted alkyl, a C$_3$–C$_{20}$ substituted or unsubstituted alkenyl, a C$_1$–C$_{20}$ substituted or unsubstituted alkanoyl, or a substituted or unsubstituted aroyl. M is H, Li, Na, Cs, or K. The integer x ranges from 1–40 and preferably from 2–25.

Another example of an organic group is an aromatic group of the formula A$_y$Ar—, which corresponds to a primary amine of the formula A$_y$ArNH$_2$. In this formula, the variables have the following meanings: Ar is an aromatic radical selected from phenyl, naphthyl, anthracenyl, phenanthrenyl, biphenyl, pyridinyl, and triazinyl; A is a substituent on the aromatic radical independently selected from a functional group described above or A is a linear, branched or cyclic hydrocarbon radical (preferably containing 1 to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl. When A is a (C$_2$–C$_4$ alkyleneoxy)$_x$R" group, it is preferably a polyethoxylate group, a polypropoxylate group, or a random or block mixture of the two.

Another example of a modified colored pigment comprises a pigment (e.g. carbon black) and an attached organic group having a) an aromatic group or a C$_1$–C$_{12}$ alkyl group and b) at least one group of the formula SO$_2$NR$_2$ or SO$_2$NR(COR). R is independently hydrogen, a C$_1$–C$_{20}$ substituted or unsubstituted alkyl, a C$_3$–C$_{20}$ substituted or unsubstituted alkenyl, (C$_2$–C$_4$ alkyleneoxy)$_x$R' or a substituted or unsubstituted aryl; R' is hydrogen, a C$_1$–C$_{20}$ substituted or unsubstituted alkyl, a C$_3$–C$_{20}$ substituted or unsubstituted alkenyl, a C$_1$–C$_{20}$ substituted or unsubstituted alkanoyl or substituted or unsubstituted aroyl; and x is from 1 to 40. Aromatic groups include p-C$_6$H$_4$SO$_2$NH$_2$, p-C$_6$H$_4$SO$_2$NHC$_6$H$_{13}$, p-C$_6$H$_4$SO$_2$NHCOCH$_3$, p-C$_6$H$_4$SO$_2$NHCOC$_5$H$_{11}$ and p-C$_6$H$_4$SO$_2$NHCOC$_6$H$_5$.

As stated earlier, the modified colored pigment (e.g. modified carbon products) above are useful in non-aqueous ink formulations. Thus, the invention provides an improved ink composition containing a suitable solvent and a modified colored pigment, like a modified carbon product, having attached an organic group comprising a) a substituted or unsubstituted aromatic group or a C$_1$–C$_{12}$ alkyl group and b) at least one ionic group, at least one ionizable group or a mixture of an ionic group and an ionizable group. Other known ink additives may be incorporated into the ink formulation. It is also within the bounds of the present invention to use an ink formulation containing a mixture of unmodified pigments, like carbon black, with the modified colored pigments, such as modified carbon products.

In general, an ink includes a colorant or pigment and solvents to adjust viscosity and drying. An ink may optionally further include a vehicle or varnish which functions as a carrier during printing and/or additives to improve printability, drying, and the like. For a general discussion on the properties, preparation and uses of inks, see *The Printing Manual,* 5th Ed., R. H. Leach, et al, Eds. (Chapman & Hall, 1993).

The modified colored pigment, such as modified carbon products, of the invention can be incorporated into an ink formulation using standard techniques either as a predispersion or as a solid. Use of the modified colored pigments (e.g. modified carbon products) of the present invention may provide a significant advantage and cost savings by reducing the viscosity of the formulation. This may also allow higher loading of pigment, e.g. carbon black, product in a formulation. The milling time may be reduced as well. The modified colored pigment (e.g. modified carbon products) of the present invention may also provide improved jetness, blue tone, and gloss.

The modified colored pigments (e.g. modified carbon products) above may also be used in non-aqueous coating compositions such as paints or finishes. Thus, an embodiment of the present invention is a coating composition containing a suitable solvent and the modified colored pigment (e.g. modified carbon product) of the present invention. Other conventional coating additives may be incorporated into the non-aqueous coating compositions such as a binder.

Non-aqueous coating formulations vary widely depending on the conditions and requirements of final use. In general, coating systems contain up to 30% by weight pigment. The resin content can vary widely up to nearly 100%. Examples include acrylic, alkyd, urethane, epoxy, cellulosics, and the like. Solvent content may vary between 0 and 80%. Examples include aromatic hydrocarbons, aliphatic hydrocarbons, alcohols, polyalcohols, ketones, esters, and the like. Two other general classes of additives are fillers and modifiers. Examples of fillers are other colored pigments, clays, talcs, silicas, and carbonates. Fillers can be added up to 60% depending on final use requirements. Examples of modifiers are flow and leveling aids and biocides generally added at less than 5%. The modified colored pigments of the present invention can be incorporated into a non-aqueous coating composition using standard techniques either as a predispersion or as a solid.

Examples of non-aqueous media for the incorporation of compositions containing the modified colored pigments (e.g. modified carbon products) of the present invention include, but are not limited to, melamine-acrylic resins, melamine-alkyd resins, urethane-hardened alkyd resins, urethane-hardened acrylic resins, and the like. The modified colored pigments (e.g. modified carbon products) of the present invention may also be used in aqueous emulsion paints. In these types of paints, there is a non-aqueous portion containing the pigment wherein the non-aqueous portion is then dispersed in the aqueous paint. Accordingly, the modified colored pigments (e.g. modified carbon products) of the present invention can be used as part of the non-aqueous portions which is then dispersed into the aqueous emulsion paints.

The modified colored pigments (e.g. carbon black products) of the present invention are also useful in aqueous ink and coating formulations. Aqueous includes mixtures of water and other water-miscible or -dispersible substances, such as an alcohol. Thus, the invention provides an aqueous ink composition comprising water and a modified colored pigment, such as modified carbon product according to the invention. Other known aqueous ink additives may be incorporated into the aqueous ink formulation. As stated previously, an ink may consist of the various components described above. Various aqueous ink compositions are also disclosed, for example, in U.S. Pat. Nos. 2,833,736; 3,607, 813; 4,104,833; 4,308,061; 4,770,706; and 5,026,755, all incorporated herein by reference.

The modified colored pigment (e.g. modified carbon products) of the present invention, either as a predispersion or as a solid, can be incorporated into an aqueous ink formulation using standard techniques.

Flexographic inks represent a group of aqueous ink compositions. Flexographic inks generally include a colorant, a binder, and a solvent. The modified colored pigment, such as modified carbon products, of the invention may be useful as flexographic ink colorants. The modified colored pigment (e.g. modified carbon products) of the invention may be used in aqueous news inks. For example, an aqueous news ink composition may comprise water, the modified colored pigment (e.g. modified carbon products) of the invention, a resin and conventional additives such as antifoam additives or a surfactant.

The modified colored pigment of this invention may also be used in aqueous coating compositions such as paints or finishes. Thus, an embodiment of the invention is an improved aqueous coating composition comprising water, resin and a modified colored pigment (e.g. modified carbon product) according to the invention. Other known aqueous coating additives may be incorporated the aqueous coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference. The modified colored pigments (e.g. modified carbon products) of the invention, either as a predispersion or as a solid, can be incorporated into an aqueous coating composition using standard techniques.

An ink or coating may be used for a variety of applications. Preferably, in aqueous inks and coatings of the present invention, the modified colored pigments (e.g. modified carbon products) are present in an amount of less than or equal to 20% by weight of the ink or coating. It is also within the bounds of the present invention to use an aqueous or non-aqueous ink or coating formulation containing a mixture of unmodified pigment, such as carbon with the modified colored pigment, such as modified carbon products, of the present invention. Common additives such as those discussed below may be added to the dispersion to further improve the properties of the aqueous ink or coating.

Also, the modified colored pigments (e.g. modified carbon products) of the present invention can be used in ink jet inks where the ink formulation may be based on solvents, aqueous, or an aqueous emulsion.

When used in an ink jet ink composition, the ink jet ink composition will contain at least an aqueous or a non-aqueous vehicle, and a modified colored pigment wherein the colored pigment is a pigment having attached at least one organic group, wherein the organic group comprises at least one aromatic group or a $C_1$–$C_{12}$ alkyl group, and at least one ionic group, at least one ionizable group, or a mixture of an ionic group and an ionizable group. The at least one aromatic group or $C_1$–$C_{12}$ alkyl group of the organic group is directly attached to the pigment and the organic group is present at a treatment level of from about 0.10 to about 4.0 micromoles/m² of the pigment used based on nitrogen surface area of the pigment.

In a separate embodiment, the present invention also relates to a colored pigment having attached an organic group of the formula Ar—$R^1$ (I) or Ar'$R^3R^2$ (II) wherein Ar is an aromatic group and Ar' is an aromatic group. As shown in formula (I), Ar is substituted with at least one group $R_1$. As shown in formula (II), Ar' is substituted with at least one group $R^2$ and at least one group $R^3$. $R^1$ is an aromatic or aliphatic group containing a hydrophobic group and at least one hydrophilic group. $R^2$ is a hydrophilic group and $R^3$ is an aromatic or aliphatic group containing a hydrophobic group. The additional optional functional groups, described earlier, can be present on these organic groups. The organic group is present at a treatment level of from about 0.10 micromoles/m² to about 5.0 micromoles/m² of the pigment used based on the nitrogen surface area of the pigment. The present invention also relates to ink jet ink compositions comprising an aqueous or non-aqueous vehicle and a colored pigment having attached an organic group of the formula Ar—$R^1$ (I) or Ar'$R^3R^2$ (II). The image generated from such a ink jet ink composition shows improved waterfastness. As previously discussed, the colored pigment is preferably carbon wherein the carbon is preferably carbon black.

With respect to the substituent $R_1$, any aromatic or aliphatic group containing a hydrophobic group can be used as long as the resulting organic group can be attached to a colored pigment. The image generated from such an ink jet ink composition containing the modified colored pigment is preferably waterfast. A preferred example of an aliphatic group has the formula:

$$-(CO)-NH-R^4-CO_2^- -M^+ \quad (III)$$

where $R^4$ is a substituted or unsubstituted alkylene group. The alkylene group is preferably a $C_1$–$C_{15}$ alkylene group, such as a methylene, butylene, and the like. The alkylene group which represents $R^4$ can optionally be substituted with at least one functional group. The functional group can be the same groups previously described above as ionic functional groups and are preferably a sulfinic acid group, a sulfonic acid group, a phosphonic acid group, a carboxylic acid group, or a salt of any one of these groups. The hydrophilic groups that form a part of $R_1$ or the hydrophilic groups of $R^2$, can be the same groups represented by the functional groups such as sulphonic acid group, a sulfonic acid group, a phosphoric acid group, a carboxylic acid group or salts thereof. An example includes —$CO_2^-$—$M^+$, where $M^+$ can be any counter-ion, such as H, Li, Na, Cs, K, and the like. In formula (III) above, preferred examples of the aliphatic group are where $R^4$ is an ethylene, $CH(C_2H_4CO_2^- M^+)$, or a methylene.

The colored pigment having attached at least one organic group preferably has an average mean diameter of less than 2 μm, more preferably less than 0.5 μm and most preferably an average mean diameter of between about 0.05 μm to about 0.3 μm. Modified colored pigments having this average mean diameter provide sufficient stability to an ink jet ink composition when part of the ink jet ink composition.

The ink jet ink compositions containing modified colored pigments having organic groups of formula (I) or (II) can have an image dry time of from about 0.1 second to about 10 minutes, more preferably an image dry time of 5 minutes or less, even more preferably an image dry time of from about 1 minute or less, and most preferably an image dry time of from about 0.1 second to about 10 seconds. The image dry time is determined by the period of time it takes for an ink which is applied on a substrate to dry, spread on a substrate, diffuse into the substrate, and evaporate the ink components.

The ink jet ink composition can have a decreased inter-color bleed compared to dye-based ink jet inks. For instance, the ink jet ink compositions of the present invention can have an average inter-color bleed of from about 1 μm to about 10 μm, preferably an inter-color bleed of about 5 μm or less, are most preferably an inter-color bleed of about 1 μm or less.

The ink jet ink compositions of the present invention can also have an improved optical density compared to dye-based ink jet inks and/or untreated pigment-based ink jet inks. The ink jet ink compositions, for instance, can have an optical density of at least about 1.0, preferably at least about 1.25, even more preferably from about 1.2 to about 1.7, and most preferably at least 1.5.

With the use of these ink jet ink compositions, waterfastness can be improved with respect to an image generated by an ink jet ink composition using the modified colored pigments of the present invention in ink jet ink compositions at a treatment level from about 0.10 micromoles/m² to about 5.0 micromoles/m² of the pigment used based on nitrogen surface area of the pigment.

In general, the ink compositions of the present invention may be prepared utilizing conventional techniques known to those skilled in the art, such as combining or mixing the desired components in suitable medium. Typically, the ink compositions are aqueous systems and include therein a significant amount of water, preferably deionized or distilled water. For example, the amount of water or similar medium is generally present in an amount ranging from about 60% to about 95%, preferably from about 75% to about 90%, based on the weight of the ink composition.

Suitable additives are generally incorporated into the ink compositions to impart a number of desired properties while maintaining the stability of the compositions. Such additives are well known in the art and include humectants, biocides, binders, drying accelerators, penetrants, surfactants, and the like. For example, a humectant may be added to reduce the rate of evaporation of water in the ink to minimize print head nozzle clogging. If the ink begins to dry out, the humectant concentration increases and evaporation decreases further. Humectants may also affect other properties of the ink and prints made therefrom, such as viscosity, pH, surface tension, optical density, and print quality. Such humectants typically include ethylene glycol, propylene glycol, diethylene glycols, glycerine, dipropylene glycols, polyethylene glycols, polypropylene glycols, alkane diols, amides, ethers, carboxylic acids, esters, alcohols, organosulfides, organosulfoxides, sulfones, alcohol derivatives, 3-pyrrolidone, ether derivatives, amino alcohols, and ketones. The amount of a particular additive will vary depending on a variety of factors including the molecular weight of the polymers, the viscosity, the amount of any ammonium salt added, as well as the nature of the polymers, the nature of any organic groups attached to the pigment, e.g., modified carbon black products.

Printed images may be generated from the ink compositions of the present invention by incorporating such compositions into a suitable printing apparatus, and generating an image onto a substrate. Suitable ink jet printers include, for example, thermal printers, piezoelectric printers, continuous printers, valve jet printers and the like. Similarly, any suitable substrate can be employed including plain papers, bonded papers, coated papers, transparency materials, textile materials, plastics, polymeric films, inorganic substrates and the like.

Lastly, the present invention also relates to other non-aqueous ink and coating formulations. In these formulations, an appropriate solvent is present along with a modified colored pigment, e.g. modified carbon product, of the present invention. For these formulations, the modified colored pigment, e.g. modified carbon product comprises a pigment, such as carbon, having attached at least one organic group wherein the organic group comprises a) at least one aromatic group or a $C_1$–$C_{12}$ alkyl group, and b) at least one ionic group, at least one ionizable group, or a mixture of an ionic group and an ionizable group. The aromatic group is directly attached to the pigment, e.g. carbon, and there are no limits on the amount of organic group present on the pigment (e.g. carbon). The various additional ingredients described above with respect to the non-aqueous ink and coating formulations applies equally here as well as the amounts of the various components except for the amount of organic group on the pigment, e.g. carbon, wherein there is no upper or lower limit. The above discussion regarding the organic groups and examples thereof apply equally here.

The following examples are intended to illustrate, not limit, the claimed invention.

BET Nitrogen surface areas were obtained using ASTM D-4820. CTAB area measurements were obtained using ASTM D-3760. DBPA data were obtained using ASTM D-2414. Optical properties of the ink and coating films were determined with the following instruments: L*a*b* values with a Hunter Lab Scan 6000 at 10 degree D65 CIELAB color space instrument; optical density was measured with a MacBeth RD918 densitometer; gloss was measured with a BYK Gardner model 4527 glossmeter.

The nitrogen and external surface area (t-area) was measured following the sample preparation and measurement procedure described in ASTM D-3037. For this measurement the nitrogen adsorption isotherm is extended up to 0.55 relative pressure. The relative pressure is the pressure (P) divided by the saturation pressure (Po, the pressure at which the nitrogen condenses). The adsorption layer thickness (t in angstroms) was calculated using the relation:

$$t=0.88(P/Po)^2+6.45(P/Po)+2.98.$$

The volume (v) of nitrogen adsorbed was then plotted against $t_1$ and a straight line was then fitted through the data points for t values between 3.9 and 6.2 angstroms. The t-area was then obtained from the slope of this line as follows:

$$\text{t-area, } m^2/g=15.47\times\text{slope}.$$

Sulfur contents on the carbon black product were determined by combustion analysis after Soxhlet washing of each sample. The mmol sulfur attached was determined by difference from the assay of the untreated carbon black.

EXAMPLE 1

Preparation of a Carbon Black Product with a Diazonium Salt Generated in situ

Sulfanilic acid (3.0 g) was added to 900 mL deionized water and the mixture heated to 70–90° C. To this solution was added a carbon black with a CTAB surface area of 350 $m^2/g$, t-area of 366 $m^2/g$, and a DBPA of 120 mL/100 g (100 g). This mixture was stirred well to wet out all of the carbon black. A solution of 1.2 g sodium nitrite in 1.0 mL deionized water was added to the carbon black slurry. Gas was evolved within several minutes. Heating of the mixture was suspended and the mixture allowed to cool to ambient temperature with continued stirring. The product was isolated by evaporation of the solution in an oven at 70–100° C. The product had attached p-$C_6H_4$—$SO_3Na$ groups.

Alternatively, the product could be isolated by filtration of the slurry in a Buchner funnel and washing the solids with deionized water.

EXAMPLE 2

Preparation of Carbon Black Products having different amounts of attached groups The procedure of Example 1 was repeated with a carbon black with a CTAB surface area of 350 $m^2/g$, t-area of 366 $m^2/g$, and a DBPA of 120 mL/100 g using the amounts of reagents listed in the table below:

| Example | Sulfanilic Acid (g) | g NaNO₂/g H₂O | Carbon Black (g) |
|---|---|---|---|
| 2a | 7.0 | 2.8/3 | 100 |
| 2b | 15.0 | 6.0/6 | 100 |

EXAMPLE 3

Preparation of a Carbon Black Product Using a Pin Pelletizer

An eight inch diameter pin pelletizer was charged with 300 g of a carbon black with a CTAB surface area of 350 $m^2/g$, t-area of 366 $m^2/g$, and a DBPA of 120 mL/100 g and 15 g sulfanilic acid. The pelletizer was run at 150 rpm for 1 minute. A solution of deionized water (280 mL) and sodium nitrite (5.98 g) were added and the pelletizer was run for 2 minutes at 250 rpm. The pelletizer was stopped and the shaft and pins were scraped off, then the pelletizer was run at 650 rpm for an additional 3 minutes. The 4-sulfobenzenediazonium hydroxide inner salt was generated in situ, and it reacted with the carbon black. The product was discharged from the pelletizer and dried in an oven at 70–100° C. The product had attached p-$C_6H_4$—$SO_3Na$ groups. Analysis of a Soxhlet extracted sample for sulfur content indicated that this product had 0.15 mequiv./g attached sulfonate groups, or 0.43 micromoles/$m^2$ of attached sulfonate groups.

EXAMPLE 4

Preparation of a Carbon Black Product

A solution of the diazonium salt of 4-aminosalicylic acid was prepared as follows. To 550 mL deionized water was added 57.4 g of 4-aminosalicylic acid. The mixture was cooled in an ice bath and 93.75 mL concentrated hydrochloric acid was added. To this cold mixture was added a solution of 25.9 g sodium nitrite in 50 mL deionized water. The mixture darkened in color and some gas was released. This solution was calculated to contain 0.038 g of the diazonium of 4-aminosalicylic acid/g solution.

To a well stirred slurry of a carbon black with a CTAB surface area of 350 $m^2/g$ and a DBPA of 120 mL/100 g (200 g) in 1.8 L deionized water cooled in an ice bath was added 233.2 g of the 4-aminosalicylic diazonium solution. Gas was evolved. Stirring was continued until no further gas evolution was observed. The slurry was vacuum filtered and washed with deionized water. The wet cake was dried in an oven at 75° C. The product had attached p-$C_6H_3$-(2-OH)—COOH groups.

EXAMPLE 5

Preparation of a Carbon Black Product

To a well stirred slurry of a carbon black with a CTAB surface area of 350 $m^2/g$ and a DBPA of 120 mL/100 g (200 g) in 1.8 L deionized water cooled in an ice bath was added 1168 g of the 4-aminosalicylic diazonium solution as prepared in Example 4. Gas was evolved. Stirring was continued until no further gas evolution was observed. The slurry was vacuum filtered and washed with deionized water. The wet cake was dried in an oven at 75° C. The product had attached p-$C_6H_3$-(2-OH)—COOH groups.

EXAMPLE 6

Preparation of a Carbon Black Product

A solution of the diazonium salt of 4-aminobenzoic acid was prepared as follows. To 925 mL deionized water was added 89.1 g of 4-aminobenzoic acid. The mixture was cooled in an ice bath and 162.5 mL concentrated hydrochloric acid was added. Acetone (50 mL) was added to completely dissolve the 4-aminobenzoic acid. To this cold mixture was added a solution of 44.9 g sodium nitrite in 100 mL deionized water. The mixture darkened in color and some gas was released. This solution was calculated to contain 0.061 g of the diazonium of 4-aminobenzoic acid/g solution.

To a well stirred slurry of a carbon black with a CTAB surface area of 350 $m^2/g$ and a DBPA of 120 mL/100 g (200 g) in 1.8 L deionized water cooled in an ice bath was added 131 g of the 4-aminobenzoic diazonium solution. Gas was evolved. Stirring was continued until no further gas evolution was observed. The slurry was vacuum filtered and washed with deionized water. The wet cake was dried in an oven at 75° C. The product had attached p-$C_6H_4$—COOH groups. The product had a 325 mesh residue of 90%.

EXAMPLE 7

Preparation of Carbon Black Products having different amounts of attached groups Using the Diazonium solution prepared in Example 6, a carbon black with a CTAB surface area of 350 $m^2/g$ and a DBPA of 120 mL/100 g was functionalized with various amounts of the phenyl carboxylate group. The amounts used are presented in the table below. The procedure used was analogous to Example 6.

| Example | Amount of Diazonium Solution | Amount of Carbon Black | 325 Mesh Residue |
| --- | --- | --- | --- |
| 7a | 263 g | 200 g | 63.7% |
| 7b | 394 g | 200 g | 3.9% |
| 7c | 656 g | 200 g | 4.0% |

EXAMPLE 8

Preparation of a Carbon Black Product in a Pin Pelletizer

This process was analogous to Example 3 using 300 g of a carbon black with a CTAB surface area of 350 $m^2/g$ and a DBPA of 120 mL/100 g and 24 g of 4-aminobenzoic acid. The pelletizer was run at 500 rpm for 1 minute. A solution of deionized water (300 mL) and sodium nitrite (12.1 g) were added and the pelletizer was run for 2–3 minutes at 1100 rpm. The product was discharged from the pelletizer and dried in an oven at 70–100° C. The product had attached p-$C_6H_4$—COONa groups.

EXAMPLE 9

Preparation of a Carbon Black Product

This represents an alternative method for producing a product like that of Example 6. The product of Example 8 (150 g) was slurried in 500 mL deionized water. To this slurry was added 21.9 mL concentrated hydrochloric acid. After stirring 30 minutes, the slurry was filtered and washed with deionized water, and the wet cake was dried at 75° C. The product had attached p-$C_6H_4$—COOH groups.

EXAMPLE 10

Preparation of a Carbon Black Product

This procedure is analogous to Example 1, except an oxidized carbon black with a nitrogen surface area of 560 $m^2/g$, a DBPA of 90 mL/100 g, and a volatile content of 9.5% was used. Amounts of reagents used for each treatment level are shown in the table below. Carbon black was a 10% slurry in deionized water.

| Example | Sulfanilic Acid (g) | g $NaNO_2$/g $H_2O$ | Carbon Black (g) | mmol S attached/g Product |
| --- | --- | --- | --- | --- |
| 10a | 6.0 | 2.4/3 | 200 | 0.162 |
| 10b | 10.0 | 4.0/5 | 200 | 0.237 |
| 10c | 20.0 | 8.0/8 | 200 | 0.496 |
| 10d | 30.0 | 12.0/12 | 200 | 0.670 |
| 10e | 50.0 | 19.9/20 | 200 | 1.00 |

EXAMPLE 11

Preparation of a Carbon Black Product

The procedure of Example 3 was used where the carbon black had a t-area of 93 $m^2/g$ and a DBPA of 55 mL/100 g. The amount of reagents used are shown in the table below.

| Carbon from Example # | Carbon Black (g) | Sulfanilic Acid (g) | $NaNO_2$ (g) | Deionized Water (mL) | mmol S attached/g Product | $\mu$ mol S attached/$m^2$ Product |
| --- | --- | --- | --- | --- | --- | --- |
| 11a | 400 | 0 | 0 | 215 | 0 | 0 |
| 11b | 400 | 4 | 1.6 | 215 | 0.041 | 0.44 |
| 11c | 400 | 8 | 3.2 | 215 | 0.084 | 0.90 |
| 11d | 400 | 20 | 8.0 | 215 | 0.193 | 2.08 |

These products have attached p-$C_6H_4$—$SO_3$Na groups. Samples of each were Soxhlet extracted (ethanol) and analyzed for sulfur content. Results are shown in the table along with the corresponding amount of attachment/$m^2$.

The pellets produced from this process were ground in an 8-inch jet mill (Sturtevant, Boston, Mass.) to convert the pellets to a "fluffy" type product. This process is described in *Perry's Chemical Engineers' Handbook,"* 6th Ed., R. H. Perry and D. Green, Eds., pp. 8–46. These ground materials were used in Example 18.

EXAMPLE 12

Preparation of a Carbon Black Product

This procedure describes the preparation of a carbon black product under continuous operating conditions. 100 parts per hour of a carbon black having a CTAB surface area of 350 $m^2/g$ and a DBPA of 120 mL/100 g was charged to a continuously operating pin mixer with 25 parts per hour of sulfanilic acid and 10 parts per hour of sodium nitrite as an aqueous solution. The resultant material was dried to give a carbon black product having attached p-$C_6H_4SO_3Na$ groups. Analysis of a Soxhlet extracted (ethanol) sample for sulfur content indicated that the product had 0.95 mequiv./g attached sulfonate groups, or 2.7 micromoles/$m^2$ attached sulfonate groups.

EXAMPLE 13

Use of Carbon Black Products in Coating Compositions

This example illustrates the use of carbon black products in thermoset acrylic compositions. The standard was a carbon black with a CTAB surface area of 350 $m^2$/g and a DBPA of 120 mL/100 g without any additional treatments. The materials evaluated here were prepared in Examples 1, 2a, 2b, and 12.

The coating compositions were prepared as follows. To each one half gallon steel ball mill were charged: 2.1 kg ¼" steel balls, 3.3 kg ½" steel balls, 282 g grind masterbatch (64 parts ACRYLOID AT400 resin, 30 parts n-butanol, 6 parts methyl-n-amyl ketone), and 30 g carbon black. The mill jars were turned at 44 rpm on a jar rolling mill operating at 82 rpm (Paul O. Abbe model 96806 or equivalent) for the time indicated. The finished coating formulation was prepared by first reducing each mill with 249 g AT-400 resin and turning for one hour on the jar mill. A second reduction was done by adding 304 g of a mixture of 33 parts AT-400 resin, 35.3 parts CYMEL 303 melamine-formaldehyde resin, 7.2 parts methyl-n-amyl ketone, 8.5 parts 2-ethoxyethyl acetate (cellosolve acetate—Union Carbide), 1.8 parts CYCAT 4040 (an acid catalyst of toluenesulfonic acid and isopropanol), 0.3 parts FLUORAD FC431 additive, 14 parts n-butanol, and rolling for one hour.

ACRYLOID is a registered trademark for resins available from Rohm and Haas, Philadelphia, PA; CYMEL and CYCAT are registered trademarks for products available from Cytec Industries, West Patterson, N.J.; and FLUORAD is a registered trademark for additives available from 3M, St. Paul, Minn.

The optical properties were determined on a 3 mil film on a sealed Leneta chart that had been air dried for 30 minutes and then baked at 250° C. for 30 minutes. A Hunter Color Meter was used to measure L*, a*, and b* values. Optical density was measured with a MacBeth RD918 densitometer. Gloss was measured with a BYK Gardner model 4527 glossmeter. Viscosity was measured in Krebs Units on a Brookfield KU-1 viscometer.

Thermoset acrylic formulations were prepared according to the general method described by grinding in a ball mill for 27 hours. Draw downs, 3 mil thick, were prepared and their optical properties were evaluated. The results are summarized in the following table:

| Carbon from Example # | Optical Density | L* | a* | b* | Gloss (60°) | Viscosity |
| --- | --- | --- | --- | --- | --- | --- |
| Standard | 2.76 | 1.55 | 0.02 | 0.02 | 89.9 | 107 |
| 1 | 2.81 | 1.29 | −0.05 | −0.12 | 92.0 | 105 |
| 2a | 2.75 | 1.44 | 0.03 | −0.06 | 90.0 | 98 |
| 2b | 2.71 | 1.46 | −0.06 | 0.15 | 87.5 | 91 |
| 12 | 2.77 | 1.40 | 0.02 | 0.12 | 81.3 | 82 |

There is a drop in formulation viscosity as treatment level is increased. All optical properties peak at the lower levels; the coating produced using the carbon black product from Example 1, treated with 3 wt % sulfanilic acid diazonium salt is more optically dense, jetter, bluer, and glossier than all the other materials. These samples are weight compensated for the treatment, i.e., the same weight of carbon black in each formulation.

EXAMPLE 14

Carbon Black Products Functionalized with Various Levels of Salicylic Acid Used in a Thermoset Acrylic Formulation Carbon black products prepared in Examples 4 and 5 were evaluated in a thermoset acrylic formulation according to general method in Example 13 after grinding for 18 and 42 hours. The results are summarized in the table below. In this example, equal weights of carbon black product were used in each formulation. The standard was carbon black with a CTAB surface area of 350 $m^2$/g and a DBPA of 120 mL/100 g without any additional treatments.

| Carbon From Example # | Grinding Time (h) | Optical Density | L* | a* | b* | Gloss (60°) | Viscosity |
| --- | --- | --- | --- | --- | --- | --- | --- |
| Standard | 18 | 2.82 | 1.35 | −0.15 | 0.03 | 93.0 | 93 |
| Standard | 42 | 2.82 | 1.24 | −0.07 | −0.27 | 91.2 | 101 |
| 4 | 18 | 2.87 | 1.16 | −0.14 | −0.16 | 93.7 | 97 |
| 4 | 42 | 2.94 | 1.02 | −0.04 | −0.41 | 92.8 | 103 |
| 5 | 18 | 2.85 | 1.25 | −0.16 | −0.18 | 92.2 | 94 |
| 5 | 42 | 2.86 | 1.10 | 0.03 | −0.36 | 92.S | 98 |

At each grinding time the material with the lower treatment, Example 4, shows greater optical density, jetness (L*), deeper bluetone, and more gloss than either the untreated standard or the more highly treated materials from Example 5.

EXAMPLE 15

Carbon Black Product Treated with Various Levels of 4-Aminobenzoic Acid Used in a Thermoset Acrylic Formulation Carbon black products prepared according to Examples 6, 7a, and 7b were evaluated in a thermoset acrylic formulation, as described in Example 13. The optical properties of a coating prepared after 27 hours of grinding are shown in the Table below. Each formulation contained 30 g of the carbon black product. The standard was carbon black with a CTAB surface area of 350 $m^2$/g and a DBPA of 120 mL/100 g without any additional treatments.

| Carbon from Example # | Optical Density | L* | a* | b* | Gloss (60°) | Viscosity |
| --- | --- | --- | --- | --- | --- | --- |
| Standard** | 2.82 | 1.58 | −0.06 | 0.17 | 91.6 | 94 |
| 6 | 3.09 | 0.88 | −0.15 | −0.26 | 91.7 | 100 |
| 7a | 3.19 | 0.75 | −0.04 | −0.22 | 96.5 | 91 |
| 7b | 3.22 | 0.75 | −0.06 | −0.22 | 98.0 | 88 |
| 7c | 3.20 | 0.74 | −0.Io | −0.20 | 98.4 | 85 |

**Sample prepared after 42 hours grinding.

In this example with attached benzoic acid groups, Example 7a, treated with 8 wt % 4-aminobenzoic acid diazonium salt, is sufficient to give improved optical properties over the standard, untreated, carbon black. Higher treatment levels did not improve the coating properties significantly.

EXAMPLE 16

Performance of a Surface Treated Carbon Black Product Further Functionalized with Various Amounts of Sulfanilic Acid Diazonium Salt Carbon Black products prepared in Examples 10a–e (3, 5, 10, 15, 25 wt % sulfanilic acid diazonium, respectively) were evaluated in a thermoset acrylic formulation, as described in Example 13. The optical properties of a coating prepared after 27 hours grinding are shown in the table below. Each formulation contained an equal amount of carbon black product. The standard was a surface treated carbon black with a nitrogen surface area of 560 m$^2$/g, a DBPA of 90 mL/100 g, and a volatile content of 9.5%.

| Carbon from Example # | Optical Density | L* | a* | b* | Gloss (60°) | Viscosity |
|---|---|---|---|---|---|---|
| Standard | 2.68 | 1.74 | −0.07 | 0.11 | 88.8 | 92 |
| 10a | 2.95 | 1.32 | −0.01 | 0.14 | 93.7 | 89 |
| 10b | 2.88 | 1.12 | −0.11 | −0.19 | 86.3 | 98 |
| 10c | 2.84 | 1.21 | −0.08 | −0.10 | 76.9 | 102 |
| 10d | 2.85 | 1.24 | −0.07 | −0.06 | 84.0 | 99 |
| 10e | 2.81 | 1.34 | −0.03 | 0.08 | 90.1 | 97 |

Oxidized carbon black products with attached sulfonate acid groups have greater optical densities, jetness, and bluer undertone than an untreated standard. Example 10b (5 wt % treatment) was jetter and bluer than the other materials.

EXAMPLE 17

Carbon Black Product Treated With Various Levels of Sulfanilic Acid Used in a Urethane Hardened Acrylic Formulation This example illustrates the use of carbon black products in an acrylic enamel formulation. Carbon black products from Examples 3 and 12 were used in the following composition. The carbon black products were ground in small steel mills (2 1/16" tall×2 3/32" diameter) on a paint shaker. Each mill was charged with 200 g 3/16" chrome steel balls, 2.19 g carbon product, and 19.9 g of grind vehicle consisting of an 80/20 mixture of DMR-499 acrylic mixing enamel (PPG Finishes, Strongsville, Ohio) and xylene. This mixture was ground for 50 minutes. Samples were evaluated on a Hegman gauge. The final formulation was made by adding 23.3 g DMR-499, 17.3 g xylene and 1.4 g DXR-80 urethane hardener (PPG Finishes, Strongsville, Ohio) to the mill and shaking for 15 minutes. A 3 mil drawdown of the completed formulation was made on a sealed Leneta chart. The film was air dried for 30 minutes, then baked at 140° F. for 30 minutes. Optical properties were determined as described in Example 13.

The standard was a carbon black with a CTAB surface area of 350 m$^2$/g and a DBPA of 120 mL/100 g without any additional treatments. Optical properties and Hegman grinds are shown in the table below. Hegman values were measured on a Hegman gauge where 5 "sand" particles are clustered.

| Carbon from Example # | Optical Density | L* | a* | b* | Gloss (60°) | Hegman Grind at 50 min. |
|---|---|---|---|---|---|---|
| Standard | 2.83 | 1.23 | 0.08 | 0.05 | 52.3 | 4.0 |
| 3 | 3.08 | 0.70 | −0.04 | −0.27 | 88.0 | 6.6 |
| 12 | 2.79 | 1.41 | 0.17 | −0.03 | 92.5 | 6.2 |

In this formulation, wetting of the standard product was incomplete, as evidenced by the very low gloss and Hegman gauge readings. The carbon from Example 12 was weight compensated for the amount of treatment on the carbon (2.66 g). The product of Example 3 (5 wt % sulfanilic acid diazonium salt treatment) showed better optical density, jetness, and bluetone values compared to both the standard and the more highly treated materials.

EXAMPLE 18

Evaluation of Carbon Black Products in a Gloss Ink Formulation

The carbon black products of Examples 11a–11d were evaluated in a standard heat set gloss ink formulation prepared on a three roll mill. The performance of 11b–11d was compared to the control sample (Example 11a).

The carbon black samples were prepared for grind on a three roll mill by hand mixing 15 g of the carbon black with 35 g of the grind masterbatch. The masterbatch consists of 9 parts LV-3427XL (heatset grinding vehicle, Lawter International, Northbrook, Ill.), to 1 part MAGIESOL 47 oil. This mixture, 50 g, was ground on a Kent three roll mill running at 70° F. Samples were let down by mixing with an equal amount of grind masterbatch and then applied to a NIPRI production grindometer G-2 for evaluation of the grind. The standards were typically passed four times through the mill. Additional passes were made if the grind gauge reading was above 20 microns. The finished ink was produced by mixing the milled material with an equal weight of letdown masterbatch (3 parts LV3427XL, 12 parts LV6025 (heatset gel vehicle, Lawter International), 5 parts MAGIESOL 47 oil) and passing one time through the three roll mill.

MAGIESOL is a registered trademark for oils available from Magie Brothers, Franklin Park, Ill.

Fineness of grind data and viscosity measurements of the resulting inks are shown in the table below. The values in the grind data table are in microns as measured on a G-2 grind gauge and indicate the level where 10 scratches/5 scratches/5 defect grains are detected on the gauge. Steel bar Laray viscosity was measured according to ASTM method D4040-91 at 25° C. using a TMI 95-15-00 Laray viscometer (Testing Machines Inc.), vertical glass plate flow was measured by the distance a 0.5 cc sample of ink travels down a vertical glass plate after the samples are allowed to rest for 0, 30, and 60 minutes prior to standing the plate, and spreadometer properties were measured using a Toyoseiki spreadometer (Testing Machines Inc.) as described in Japanese Industrial Standard, Testing Methods for Lithographic and Letterpress Inks (JIS K5701-4.1.2).

| Properties/Sample | 11a | 11b | 11c | 11d |
|---|---|---|---|---|
| Carbon Black Properties | | | | |
| Ink Preparation | | | | |
| Grinding Base (5 scr/10 scr/sand) Three roll mill | | | | |
| 1 pass | 6/0/46 | 0/0/27 | 0/0/24 | 0/0/24 |
| 2 passes | 0/0/24 | 0/0/14 | 0/0/22 | 0/0/20 |
| 3 passes | 0/0/20 | 0/0/13 | 0/0/12 | 0/0/17 |
| 4 passes | 0/0/16 | 0/0/8 | 0/0/12 | 0/0/18 |
| Ink Properties | | | | |
| Steel Bar Laray Viscosity | | | | |
| Viscosity (poise at 2500 s$^{-1}$) | 66.7 | 64.6 | 61.7 | 58.2 |
| Yield Value (dyne/cm at 2.5 s$^{-1}$) | 507 | 553 | 533 | 490 |

| Properties/Sample | 11a | 11b | 11c | 11d |
|---|---|---|---|---|
| Vertical Glass Plate Flow (mm) | | | | |
| No Setting | | | | |
| 20 minutes | 85 | 125 | 105 | 115 |
| 40 minutes | 95 | 155 | 132 | 144 |
| 60 minutes | 105 | 175 | 145 | 167 |
| 30 Minutes Setting | | | | |
| 20 minutes | 43 | 98 | 85 | 95 |
| 40 minutes | 56 | 126 | 109 | 119 |
| 60 minutes | 61 | 145 | 126 | 139 |
| 60 Minutes Setting | | | | |
| 20 minutes | 26 | 95 | 79 | 86 |
| 40 minutes | 42 | 125 | 102 | 115 |
| 60 minutes | 48 | 143 | 120 | 135 |
| Spreadometer Properties | | | | |
| Slope (mm) | 8.6 | 9.8 | 9.3 | 9.2 |
| Intercepter (mm) | 23.9 | 23.3 | 24.9 | 25.6 |
| Yield Value (dyne/cm$^2$) | 128.4 | 113.3 | 116.0 | 114.1 |

These data demonstrate how the treatment modifies the rheology of the ink formulation. In these cases, increasing the treatment level reduced the Laray viscosity slightly, but significantly increased the flow (vertical glass plate flow). That the flow remains high after the one hour setting time indicates that this ink composition will flow more consistently over time. This is particularly valuable in offset ink.

The spreadometer slope is also an indication of flowability, but under different shear conditions (higher values correspond to greater flow). The spreadometer intercepter is an indication of the sample's plastic viscosity.

Optical properties for inks made from the carbon black products 11b–11d and the standard carbon black (11a) were determined from prints made using an RNA-42 printability tester (Research North America Inc.) and are shown in the table below. Values for 1.0 and 2.0 micron film thicknesses were calculated from regression of the data from the prints made over a range of film thicknesses.

| Example | OD | L* | a* | b* | Gloss 60° |
|---|---|---|---|---|---|
| Optical Properties of a 1 Micron Film Made From Samples 11a–d | | | | | |
| 11a | 1.47 | 19.9 | 1.94 | 5.87 | 45.3 |
| 11b | 1.37 | 23.23 | 1.93 | 6.18 | 45.1 |
| 11c | 1.38 | 23.67 | 1.79 | 5.72 | 42.3 |
| 11d | 1.20 | 31.10 | 1.63 | 5.84 | 38.6 |
| Optical Properties of a 2 Micron Film Made From Samples 11a–d | | | | | |
| 11a | 2.28 | 2.93 | 0.68 | 0.75 | 49.1 |
| 11b | 2.24 | 3.16 | 0.94 | 1.33 | 46.8 |
| 11c | 2.08 | 5.41 | 1.53 | 2.67 | 48.1 |
| 11d | 2.10 | 4.30 | 0.95 | 1.39 | 39.7 |

These data indicate that increasing treatment levels diminish the optical properties somewhat. Example 11b combines the improved rheology (for offset ink application) and very good dispersion with a minimum of loss of the optical properties.

EXAMPLE 19

Preparation of a Carbon Black Product

The procedure of Example 12 was repeated except that 100 parts of a carbon black having a nitrogen specific surface area of 200 m$^2$/g and a DBPA of 120 mL/100 g, 12.5 parts sulfanilic acid, 5 parts sodium nitrite as an aqueous solution, and 110 parts deionized water was used. The rate of the pin pelletizer was 100 pounds per hour. The resultant product had attached p-$C_6H_4$—$SO_3^-Na^+$ groups.

EXAMPLE 20

Preparation of a Carbon Black Products Having Different Amounts of Attached Groups The procedure of Example 19 was repeated with a carbon black with a nitrogen specific surface area of 200 m$^2$/g and a DBPA of 120 mL/100 g except using the amounts of reagents listed in the table below:

| Example | Sulfanilic Acid (parts) | NaNO$_2$ (parts) | Carbon Black (parts) | Deionized H$_2$O (parts) |
|---|---|---|---|---|
| 20a | 6.0 | 2.4 | 100 | 110 |
| 20b | 9.0 | 3.6 | 100 | 110 |

EXAMPLE 21

Preparation of a Carbon Black Product

The procedure of Example 19 was repeated using a carbon black with a nitrogen specific surface area of 200 m$^2$/g and a DBPA of 120 mL/100 g except using 14 parts p-aminobenzoic acid, 100 parts carbon black, 7 parts sodium nitrite as an aqueous solution, and 110 parts deionized water. The rate of the pin pelletizer was 100 pounds per hour. The resultant product had attached p-$C_6H_4$—$CO_2^-Na^+$ groups.

EXAMPLE 22

Preparation of a Carbon Black Product Having Different Amounts of Attached Groups The procedure of Example 21 was repeated with a carbon black with a nitrogen specific surface area of 200 m$^2$/g and a DBPA of 120 mL/100 g except using the amounts of reagents listed in the table below:

| Example | p-Amino-benzoic Acid (parts) | NaNO$_2$ (parts) | Carbon Black (parts) | Deionized H$_2$O (parts) |
|---|---|---|---|---|
| 22a | 9.0 | 4.5 | 100 | 110 |
| 22b | 11.0 | 5.5 | 100 | 110 |

EXAMPLE 23

Preparation of a Carbon Black Product

The procedure of Example 1 was repeated except that 100 g carbon black had a nitrogen specific surface area of 140 m$^2$/g and a DBPA of 116 mL/100 g, 10.72 g of N-(4-aminophenyl)pyridinium nitrite, 25 mL of a 2 M/L nitric acid solution, and 500 g of distilled water. The resultant product had attached $C_6H_4(NC_5H_5)^+NO_3^-$ groups.

EXAMPLE 24

Preparation of a Carbon Black Product Having Different Amounts of Attached Groups The procedure of Example 23 was repeated using a carbon black with a nitrogen specific surface area of 140 $m^2/g$ and a DBPA of 116 mL/100 g except using the amounts of reagents listed in the table below.

| Example | N-(4-amino phenyl) pyridinium nitrite (g) | 2 M/L $HNO_3$ (mL) | Carbon Black (g) | Distilled $H_2O$ (g) |
|---|---|---|---|---|
| 24a | 8.58 | 20 | 100 | 500 |

-continued

| Example | N-(4-amino phenyl) pyridinium nitrite (g) | 2 M/L $HNO_3$ (mL) | Carbon Black (g) | Distilled $H_2O$ (g) |
|---|---|---|---|---|
| 24b | 6.43 | 15 | 100 | 500 |

EXAMPLE 25

Evaluation of a Carbon Black Product in an Ink Jet Ink Formulation Composition The carbon black products of Examples 19 and 20 were dispersed into 10–20% (w/w) slurries with distilled water and filtered to less than 1 micron in diameter. The dispersions were then formulated into ink jet inks, with the resulting black pigment concentration of 5%, 10% 2-pyrrilondone, 10% pentanediol, and 75% distilled water (Formulation 1).

The inks were placed into emptied and cleaned ink jet cartridges and printed with Hewlett-Packard DeskJet 660 printer on Gilbert® 25% cotton-20 lb. paper having an optical density of 0.10, Champion® Ink Jet Soft Bright White 20 lb. paper having an optical density of 0.11, Hammermill® Fore® DP Long Grain paper having an optical density of 0.12, and Xerox 4024 DP 20 lb. paper having an optical density of 0.10 . The resulting print properties of optical density and waterfastness over time were measured and compared below.

The optical density was measured using a MACBETH RD-915 densitometer from Macbeth, New Windsor, N.Y. following ANSI procedure CGATS, 4-1993 (MACBETH is a registered trademark of Kollmorgen Instruments Corporation).

The following procedure was utilized to determine waterfastness. The printed image was placed on a stand at 45° angle. A calibrated pipette was used to dispense 0.25 mL of distilled water over the image at five minutes after printing, one hour after printing, and two hours after printing. The water produced a run-off portion from the image. The waterfastness, in this case a measurement of the true wash-off of the image, was determined by subtracting the optical density of the paper from the optical density of the run-off portion of the image.

| Example in | Print Optical Density on Various Papers | | | |
|---|---|---|---|---|
| Formulation 1 | Gilbert | Champion | Hammermill | Xerox |
| 19 | 1.34 | 1.36 | 1.33 | 1.35 |
| 20a | 1.51 | 1.40 | 1.47 | 1.51 |
| 20b | 1.61 | 1.56 | 1.57 | 1.56 |

| | Print Wash-Off Optical Density Over Time on Various Papers | | | | | | | | | | | |
|---|---|---|---|---|---|---|---|---|---|---|---|---|
| | Gilbert | | | Champion | | | Hammermill | | | Xerox | | |
| Example | 5 min | 1 hr | 2 hr | 5 min | 1 hr | 2 hr | 5 min | 1 hr | 2 hr | 5 min | 1 hr | 2 hr |
| 19 | 0.40 | 0.44 | 0.40 | 0.52 | 0.51 | 0.41 | 0.19 | 0.19 | 0.17 | 0.38 | 0.45 | 0.36 |
| 20a | 0.05 | 0.05 | 0.04 | 0.43 | 0.43 | 0.33 | 0.01 | 0.00 | 0.00 | 0.15 | 0.03 | 0.02 |
| 20b | 0.44 | 0.40 | 0.25 | 0.52 | 0.65 | 0.71 | 0.35 | 0.25 | 0.18 | 0.42 | 0.40 | 0.46 |

No noticeable print runoff was observed at <0.20 optical density units. The data showed the optical density was highest for the print containing Example 20b, while the print that was most waterfast was made with Example 20a. As illustrated, the print optical density and waterfastness were both influenced by the amount and type of groups that are on the carbon black, and an optimum amount of groups may be added to the carbon black for the desired print property. Also, print properties can be dependent upon properties of the ink jet ink formulation, the printer, and the paper or substrate.

EXAMPLE 26

Evaluation of a Carbon Black Product in an Ink Jet Ink Formulation

The carbon black products of Examples 21 and 22 were prepared and incorporated into the same ink formulations as in Example 25 with the results shown below. The data showed that as the amount of added groups on the carbon black pigment decreased, the waterfastness of the printed image, as determined by the method described in Example 25, improved. The prints made with Example 22a were more waterfast and generally darker (higher o.d.) then those made with the other examples using Formulation 1.

| Example in | Print Optical Density on Various Papers | | | |
|---|---|---|---|---|
| Formulation 1 | Gilbert | Champion | Hammermill | Xerox |
| 21 | 1.46 | 1.43 | 1.52 | 1.48 |
| 22a | 1.56 | 1.57 | 1.58 | 1.60 |
| 22b | 1.54 | 1.55 | 1.61 | 1.57 |

| | Print Wash-Off Optical Density Over Time on Various Papers | | | | | | | | | | | |
|---|---|---|---|---|---|---|---|---|---|---|---|---|
| | Gilbert | | | Champion | | | Hammermill | | | Xerox | | |
| Example | 5 min | 1 hr | 2 hr | 5 min | 1 hr | 2 hr | 5 min | 1 hr | 2 hr | 5 min | 1 hr | 2 hr |
| 21 | 0.04 | 0.04 | 0.03 | 0.50 | 0.40 | 0.47 | 0.04 | 0.02 | 0.02 | 0.06 | 0.02 | 0.02 |
| 22a | 0.00 | 0.01 | 0.02 | 0.27 | 0.16 | 0.14 | 0.01 | 0.02 | 0.00 | 0.00 | 0.00 | 0.00 |
| 22b | 0.04 | 0.02 | 0.02 | 0.47 | 0.39 | 0.41 | 0.01 | 0.01 | 0.01 | 0.04 | 0.01 | 0.01 |

EXAMPLE 27

Evaluation of a Carbon Black Product in an Ink Jet Ink Formulation

The carbon black products of Examples 23 and 24 were prepared and incorporated into the same ink formulations as Example 25 with the results shown below. The data showed that the print with the highest optical density was made with Example 23, while the same print was less waterfast on some papers compared to the other samples. As shown, prints made with a positively-charged carbon black were very waterfast on most papers.

| Example in | Print Optical Density on Various Papers | | | |
|---|---|---|---|---|
| Formulation 1 | Gilbert | Champion | Hammermill | Xerox |
| 23 | 1.47 | 1.40 | 1.47 | 1.47 |
| 24a | 1.43 | 1.40 | 1.46 | 1.41 |
| 24b | 1.27 | 1.26 | 1.33 | 1.33 |

| | Print Wash-Off Optical Density Over Time on Various Papers | | | | | | | | | | | |
|---|---|---|---|---|---|---|---|---|---|---|---|---|
| | Gilbert | | | Champion | | | Hammermill | | | Xerox | | |
| Example | 5 min | 1 hr | 2 hr | 5 min | 1 hr | 2 hr | 5 min | 1 hr | 2 hr | 5 min | 1 hr | 2 hr |
| 23 | 0.08 | 0.04 | 0.02 | 0.26 | 0.13 | 0.07 | 0.01 | 0.01 | 0.00 | 0.01 | 0.01 | 0.00 |
| 24a | 0.02 | 0.02 | 0.01 | 0.06 | 0.05 | 0.05 | 0.01 | 0.00 | 0.01 | 0.00 | 0.01 | 0.00 |
| 24b | 0.01 | 0.00 | 0.00 | 0.03 | 0.03 | 0.03 | 0.00 | 0.00 | 0.02 | 0.02 | 0.01 | 0.01 |

Procedures Used to Determine Pigment and Ink Properties

Nitrogen content of the carbon black and modified carbon black was determined with a photometric method (Kjeldahl) using Nessler's reagent, with a reading at 425 nm.

The mean particle diameter was determined by using MICROTRAC Ultrafine Particle Analyzer from Leeds & Northrup (Honeywell), St. Petersberg, Fla. The following conditions for carbon black were used: non-transparent, non-spherical particles; density=1.86 g/m$^3$. Distilled water was the dispersing liquid. A run time of six minutes was used.

The optical densities (O.D.) of prints were measured using a MACBETH RD918 Densiometer from Macbeth, New Windsor, N.Y. following ANSI procedure CGATS 4-1993. MACBETH is a registered trademark of Kollmorgen Corporation.

The rate of print waterfastness/dry time was determined as follows. Images were printed on papers (Xerox 4024 DP 20 lb. and Plover Bond 20 lb. papers). The papers were placed on a stand at a 45° angle. A calibrated pipette was used to dispense 0.25 ml of distilled water to the image at various times after printing. The rate of waterfastness is defined as the time after printing that no wash-off of the image occurs.

The lack of intercolor bleed, or edge raggedness, of black characters on a yellow background was determined qualitatively (poor to excellent). Quantitative measurements were made by printing a black line on a yellow background and measuring the distances of diffusion of the black into the yellow using a calibrated ocular lens and a light microscope. The five highest black peaks per line were averaged (maximum line roughness), in order to obtain a worst case scenario. In addition, four other peaks at one-inch increments were also measured per line to obtain a more representative (average) line roughness.

EXAMPLE 28

Preparation of a Black Pigment from Carbon Black and N-(4-aminobenzoyl)-B-alanine (ABA)

Twenty grams of MONARCH® 700 carbon black (Cabot Corporation, Boston, Mass.) were mixed with 90 g of distilled water (Poland Springs, Poland Springs, Me.). Four grams of N-(4-aminobenzoyl)-B-alanine (ABA; Jonas Chemical, Brooklyn, N.Y.), were added to the slurry. A sodium nitrite (Aldrich Chemicals, Milwaukee, Wis.) solution composed of 1.326 grams of sodium nitrite and 10 grams distilled water was added to the slurry. The slurry began to bubble, evolving nitrogen gas. Stirring continued for an additional hour. The slurry was then placed in an oven set at 70° C. and kept overnight (12–14 hours) until dry. Five grams of sample were Soxhelet extracted for 8–12 hours using methanol (Aldrich Chemicals, Milwaukee, Wis.) as the solvent. The extracted samples were analyzed for nitrogen content, which would have been acquired in the addition reaction of the phenyl alanine molecule to the carbon black. The results are set forth in the Table below.

Treatment Amount, Nitrogen Content, and Mean Diameter of ABA Treated Carbon Black

| Sample | ABA (g)/Carbon Black (g) | Nitrogen (%) Content of sample | Mean Diameter (um) of sample |
|---|---|---|---|
| 23a | 0.00 | 0.045 | >10 |
| 28b | 0.20 | 0.783 | 0.17 |

The addition of the N-(4-aminobenzoyl)-B-alanine with nitrite resulted in the attachment of $C_6H_4CONHC_2H_4CO_2^-Na^+$ groups. The increase in nitrogen content and the decrease in mean diameter of Sample 28b both indicate the chemical addition of $C_6H_4CONHC_2H_4CO_2^-Na^+$ groups to the carbon black. Sample 28b easily dispersed in water upon contact, whereas Sample 28a, the untreated carbon black, did not disperse in water, but rather precipitated. This example shows that ABA can attach to, and alter, the surface properties of a carbon black pigment.

EXAMPLE 29

Preparation of A Black Pigment from Carbon Black and N-(4-aminobenzoyl)-B-alanine (ABA)

The same carbon black pigment and treatment procedure of Example 28 was followed with the exception that the amount of ABA was varied from 2.0 to 3.5 grams and the amount of sodium nitrite was also varied from 0.663 to 1.16 grams, respectively, (i.e., a 1.00 Molar ratio of ABA/sodium nitrite was constant). All other procedures were similar to those of Example 28. Results are shown in the table below, along with those of Example 28, to demonstrate the effect of added amounts of ABA with an increase in nitrogen content of the samples.

Treatment Amount, Nitrogen Content, and Mean Diameter of ABA Treated Carbon Black

| Sample | ABA (g)/Carbon Black (g) | Nitrogen (%) Content of Sample | Mean Diameter (um) of sample |
|---|---|---|---|
| 28a | 0.00 | 0.045 | >10 |
| 29a | 0.10 | 0.468 | 0.18 |
| 29b | 0.125 | 0.599 | 0.17 |
| 29c | 0.15 | 0.650 | 0.18 |
| 29d | 0.175 | 0.701 | 0.17 |
| 28b | 0.20 | 0.783 | 0.17 |

This example shows that as the amount of ABA added to the reaction increases, more $C_6H_4CONHC_2H_4CO_2^-Na^+$ groups attach as evidenced by an increase in the detected amount of nitrogen. The mean diameter of the ABA samples is similar, showing that the black pigment is dispersed.

EXAMPLE 30

Preparation of A Black Pigment from Carbon Black and N-(4-aminobenzoyl)-L-glutamic acid) (ABG)

The same carbon black pigment and treatment procedure of Example 28 was followed with the exception that N-(4-aminobenzoyl)-L-glutamic acid (ABG) was used in place of ABA at 2.0–4.0 grams, while the amount of sodium nitrite was also varied from 0.519 to 1.038 grams, respectively, (i.e., a 1.00 Molar ratio of ABG/sodium nitrite was constant). All other procedures were similar to those of Example 28. Results are shown in the table below.

Treatment Amount, Nitrogen Content, and Mean Diameter of ABG Treated Carbon Black

| Sample | ABG (g)/Carbon Black (g) | Nitrogen (%) Content of Sample | Mean Diameter (um) of sample |
|---|---|---|---|
| 28a | 0.00 | 0.045 | >10 |
| 30a | 0.10 | 0.392 | 0.22 |
| 30b | 0.125 | 0.465 | 0.21 |
| 30c | 0.15 | 0.503 | 0.21 |
| 30d | 0.175 | 0.550 | 0.18 |
| 30e | 0.20 | 0.596 | 0.18 |

This example shows that as the amount of ABG added to the reaction increased, more $C_6H_4CONHCH(CO_2^-)C_2H_4CO_2^-$ groups attach as evidenced by an increase in the detected amount of nitrogen. The mean diameter of the ABG-treated carbon black samples decreased as the amount of ABG increased, showing that as more groups are added, the carbon black pigment disperses to a greater degree.

EXAMPLE 31

Preparation of a Black Pigment from Carbon Black and p-Aminohippurric acid (AHA)

The same carbon black pigment and treatment procedure of Example 28 was followed with the exception that p-aminohippurric acid (AHA) was used in place of ABA at 2.0–4.0 grams, while the amount of sodium nitrite was also varied from 0.711 to 1.423 grams, respectively, (i.e., a 1.00 Molar ratio of AHA/sodium nitrite was constant). All other procedures were similar to those of Example 28. Results are shown in the table below.

Treatment Amount, Nitrogen Content, and Mean Diameter of AHA Treated Carbon Black

| Sample | AHA (g)/Carbon Black (g) | Nitrogen (%) Content of Sample | Mean Diameter (um) of sample |
|---|---|---|---|
| 28a | 0.00 | 0.045 | >10 |
| 31a | 0.10 | 0.589 | 0.20 |
| 31b | 0.125 | 0.638 | 0.18 |
| 31c | 0.15 | 0.785 | 0.16 |
| 31d | 0.175 | 0.795 | 0.15 |
| 31e | 0.20 | 0.797 | 0.15 |

As the results show, as the amount of AHA added to the reaction increased, more $C_6H_4CONHCH_2CO_2^-Na^+$ groups attach as evidenced by an increase in the detected amount of nitrogen. The mean diameter of the AHA-treated samples decreased as the amount of AHA increases, showing that as more groups are added, the AHA-treated carbon black pigment disperses to a greater degree.

EXAMPLE 32

Preparation of A Black Pigment from Carbon Black and 2-naphthylamine 1-sulfonic acid (Tobias Acid) TA Three-hundred grams of MONARCH® 700 carbon black (Cabot Corporation, Boston, Mass.) was mixed into 1500 g. of distilled water (Poland Springs, Poland Springs, Me.) having a temperature of 70° C. Thirty grams of 2-naphthylamine 1-sulfonic acid (Tobias Acid; TA) from Omni Specialty Corp., Teaneck, N.J. was added to the slurry. Next, a sodium nitrite (Aldrich Chemicals, Milwaukee, Wis.) solution composed of 9.27 g. of sodium nitrite and 10 g. distilled water was added to the slurry. The slurry began to bubble, evolving nitrogen gas. Stirring continued for an additional hour. The slurry was then placed in an oven set at 70° C. and kept overnight (12–14 hours) until dry. The particle size analysis is reported in the table below.

Treatment Amount and Mean Diameter of TA Treated Carbon Black

| Sample | TA (g)/Carbon Black (g) | Mean Diameter (um) of sample |
|---|---|---|
| 28a | 0.00 | >10 |
| 32a | 0.10 | 0.20 |

The addition of the 2-naphthylamine 1-sulfonic acid with nitrite resulted in the attachment of napthyl sulfonate groups. Sample 32a easily dispersed in water upon contact, whereas Sample 28a, the untreated carbon black, did not disperse in water, but rather precipitated. This example shows that TA can attach to, and alter, the surface properties of a carbon black pigment.

EXAMPLE 33

Preparation of A Black Pigment from Carbon Black and 2-naphthylamine 1-sulfonic acid (Tobias Acid) TA The same carbon black pigment and treatment procedure of Example 32 was followed with the exception that 150 grams of water, 20 grams of carbon black, 5.0 grams of TA, and 1.545 grams of sodium nitrite were used. All other procedures were similar to those of Example 32. Results are shown in the table below, along with the results of Example 32, to demonstrate the effect that increased amounts of TA results in a decrease in particle size.

Treatment Amount and Mean Diameter of TA Treated Carbon Black

| Sample | TA (g)/Carbon Black (g) | Mean Diameter (um) of sample |
|---|---|---|
| 28a | 0.00 | >10 |
| 33a | 0.25 | 0.17 |
| 32a | 0.10 | 0.20 |

EXAMPLE 34

Preparation of A Black Pigment from Carbon Black and 5-amino-2-naphtylene sulfonic acid (ANSA)

The same carbon black pigment and treatment procedure of Example 32 was followed with the exception that 29.0 grams of 5-amino-2-naphthalene sulfonic acid (ANSA) (Aldrich Chemicals) and 9.67 grams of sodium nitrite were used. All other procedures were similar to those of Example 32. Results are shown in the table below. As shown in the table, attaching ANSA to carbon black results in a decrease in particle size.

TABLE 34

Treatment Amount and Mean Diameter of ANSA Treated Carbon Black

| Sample | TA (g)/Carbon Black (g) | Mean Diameter (um) of sample |
|---|---|---|
| 28a | 0.00 | >10 |
| 34a | 0.10 | 0.20 |

EXAMPLE 35

Preparation of An Ink Containing Black Pigmented Product

Black pigments (as designated in the table below) were added to water to create a dispersion, and filtered to below one micrometer. An ink was prepared using the following formulation:

| Ingredient | % (by wt.) |
|---|---|
| Treated Black Pigment (solid) | 5.0 |
| Ethylene Glycol | 10.0 |
| 2-Pyrrolidinone | 10.0 |
| Isopropanol | 40 |
| Morpholine | 0.25 |
| Distilled Water | 70.75 |

Designation of an ink of this type is by (35-black pigment), e.g., 35-28b indicates an ink of Example 33 formulation using black pigment 28b (benzoyl-B-alanine)-treated MONARCH 700 carbon black.

The ink was placed into empty and cleaned 51629A cartridges and printed using a Hewlett Packard DeskJet® 660C ink jet printer (Printer 1) onto Xerox 4024 and Plover Bond papers. Print optical density, waterfastness rate, and intercolor bleed properties were measured for the inks, and reported below using the Hewlett Packard printer on Xerox 4024 paper:

Treatment Amount, Optical Density, Rate of Waterfastness, and Lack of Intercolor Bleed (ICB)* Properties of Pigments and Inks on Xerox 4024 Paper

| Ink Sample | g Treatment/ g Carbon Black | O.D. Printer 1 | Rate of Water-fastness (units below) | Lack of I.C.B. (characters) | ICB Line Roughness (max/avg.) both in (um) |
|---|---|---|---|---|---|
| 35-29a | 0.10 | 1.53 | 25 sec | good | 15/4 |
| 35-29b | 0.125 | 1.57 | 30 sec | fair | 28/9 |
| 35-29c | 0.15 | 1.31 | 1 min | good | 26/1 |
| 35-29d | 0.175 | 1.29 | 5 min | good | 19/5 |
| 35-28b | 0.20 | 1.09 | 60 min | good/ excellent | 21/6 |
| 35-30a | 0.10 | 1.61 | 30 sec | good | 24/2 |
| 35-30c | 0.15 | 1.38 | 5 min | fair/good | 31/6 |
| 35-30e | 0.20 | 1.34 | >60 min | fair/good | 32/6 |
| 35-31a | 0.10 | 1.57 | 30 sec | good | 18/1 |
| 35-31c | 0.15 | 1.50 | 5 min | good | 20/3 |
| 35-31e | 0.20 | 1.35 | >60 min | good/ excellent | 15/4 |
| 35-32a | 0.10 | 1.28 | 30 sec | fair/good | 15/5 |
| 35-33a | 0.25 | 1.29 | >60 min | fair | 11/4 |
| 35-34a | 0.10 | 1.28 | 30 sec | fair | 11/4 |
| 51629A (pigmented) ink | — | 1.40 | 60 min | good | 7/3 |

The inks were also printed on Plover Bond paper using the Hewlett Packard DeskJet 660 printer. Results are shown in the table below.

Treatment Amount, Optical Density, Rate of Waterfastness, and Lack of Intercolor Bleed (ICB)* Properties of Pigments and Inks on Plover Bond Paper

| Ink Samples | g Treatment/g Carbon Black | O.D. Printer 1 | Rate of Waterfastness (units below) | Lack of I.C.B. (characters) |
|---|---|---|---|---|
| 35-29a | 0.10 | 1.53 | 1 min | good/excellent |
| 35-29b | 0.125 | 1.54 | 1 min | fair |
| 35-29c | 0.15 | 1.47 | 5 min | good |
| 35-29d | 0.175 | 1.44 | 5 min | good |
| 35-28b | 0.20 | 1.23 | 60 min | good/excellent |
| 35-30a | 0.10 | 1.60 | 1 min | good |
| 35-30c | 0.15 | 1.51 | 5 min | fair/good |
| 35-30e | 0.20 | 1.53 | 60 min | fair/good |
| 35-31a | 0.10 | 1.59 | 30 sec | fair/good |
| 35-31c | 0.15 | 1.50 | 5 min | good |
| 35-31e | 0.20 | 1.54 | >60 min | good/excellent |
| 51629A (Pigmented) ink | — | 1.30 | 5 min | good |

Inks containing the treated carbon blacks were also put into empty and cleaned BJ12-1 cartridges and printed using Canon BubbleJet® 4200 ink jet printers using Xerox 4024 paper. Results are set forth in the table below.

Treatment Amount, Optical Density, Rate of Waterfastness, and Lack of Intercolor Bleed (ICB)* Properties of Pigments and Inks on Xerox 4024 Paper

| Ink Sample | g Treatment/g Carbon Black | O.D.- Printer 2 on Xerox 4024 Paper | Rate of waterfastness (units below) | Lack of I.C.B. (characters) |
|---|---|---|---|---|
| 35-30a | 0.10 | 1.45 | 1 min | good |
| 35-30c | 0.15 | 1.31 | 5 min | fairlgood |
| 35-30e | 0.20 | 1.32 | 60 min | fair/good |
| 35-31a | 0.10 | 1.58 | 30 sec | fair/good |
| 35-31c | 0.15 | 1.35 | 5 min | good |
| 35-31e | 0.20 | 1.29 | >60 min | good/excellent |
| BJI2-1 (dye-based ink) | — | 1.33 | >24 hr | poor/fair |

The inks in this Example show that the printer properties (i.e., optical density, waterfastness/drying rate, lack of intercolor bleed, and edge roughness) can be controlled by the type and amount of attached groups on the carbon black. The amount and type of hydrophobic and hydrophilic groups, in addition to the untreated surface of the carbon black contribute to the final print properties. In general, prints made from the relatively lower treatment levels were darker and dried faster than those with higher treatment levels, such as the 51629A pigmented ink, and the BJ12-1 dye-based ink. Lines made with the 51629A ink were less rough than the inks made with the treated carbon blacks, which may be due to the optimizing of the black ink with the yellow ink. However, the lack of intercolor bleed amongst characters could be controlled to be better than the OEM pigmented and dye-based inks.

In addition to the treated carbon black pigment, the print properties are a function of ink formulation, ink drying, absorption into the paper, drop size of ink, ink viscosity and surface tension and paper. However, print properties were better for the inks having lower level treated samples compared to the OEM inks on two different types of paper (Xerox 4024 and Plover Bond) using two different printers.

EXAMPLE 36

Preparation of An Ink Containing Black Pigmented Product

The black pigments that were prepared as in Example 35 were put in the following formulation:

| Ingredient | % (by wt.) |
|---|---|
| Black Pigment (solid) | 5.0 |
| Distilled Water | 75 |
| Ethylene Glycol | 10.0 |
| Diethylene Glycol | 10.0 |

Designation of an ink of this type was similar to that of Example 35, but the designation (36-black pigment) was used.

The ink was placed into empty and cleaned 51629A cartridges and printed using a Hewlett Packard Desk Jet 660C ink jet printer (Printer 1) onto Xerox 4024 paper. Print optical density, waterfastness rate, and intercolor bleed were measured using the Hewlett Packard printer on Xerox 4024 paper for the inks, and reported in the table below.

Treatment Amount, Optical Density, Rate of Waterfastness, and Lack of Intercolor Bleed (ICB)* Properties of Pigments and Inks on Xerox 4024 Paper

| Ink Sample | g Treatment/ g Carbon Black | O.D.- Printer 1 on Xerox 4024 Paper | Rate of waterfastness (units below) | Lack of I.C.B. (characters) |
|---|---|---|---|---|
| 36-29a | 0.10 | 1.50 | 1 min | — |
| 36-29b | 0.125 | 1.60 | 5 min | — |
| 36-29c | 0.15 | 1.37 | 5 min | — |
| 36-29d | 0.175 | 1.41 | 5 min | — |
| 36-28b | 0.20 | 1.18 | 60 min | — |
| 36-30a | 0.10 | 1.63 | 5 min | fair/good |
| 36-30c | 0.15 | 1.48 | 1 min | good |
| 36-30e | 0.20 | 1.42 | 60 min | good |
| 36-31a | 0.10 | 1.58 | 60 min | fair/good |
| 36-31b | 0.15 | 1.54 | 90 min | fair/good |
| 36-31c | 0.20 | 1.44 | 120 min | good |
| 51529A (Pigmented) ink | — | 1.40 | 60 min | good |

This example shows that the treated carbon black pigments may be put into a formulation, other than that of Example 35, to show that the type (and amount) of hydrophobic and hydrophilic groups and amount of treatment controls print properties. The hydrophilic groups aid in the stability of the treated carbon black dispersions, while the hydrophobic groups and untreated surfaces aid in the print properties (i.e., rate of waterfastness/drying, intercolor bleed, and O.D.). Examples 35 and 36 also show that superior prints were obtained from inks containing treated carbon black pigments compared to the current OEM (pigment and dye-based) inks.

What is claimed is:

1. An ink jet ink composition comprising 1) an aqueous vehicle and 2) a modified colored pigment comprising colored pigment having attached at least one organic group, the organic group comprising a) at least one aromatic group or a $C_1$–$C_{12}$ alkyl group, and b) at least one ionic group, at least one ionizable group, or a mixture of an ionic group and an ionizable group, wherein the at least one aromatic group or $C_1$–$C_{12}$ alkyl group of the organic group is directly attached to the colored pigment and the organic group is present at a treatment level of from about 0.10 to about 4.0 micromoles/m² of the colored pigment used based on nitrogen surface area of the colored pigment.

2. The composition of claim 1, wherein treatment levels of the organic group are from about 1.5 to about 3.0 micromoles/m² of the colored pigment used based on nitrogen surface area of the colored pigment.

3. The composition of claim 1, wherein said modified colored pigment has a average mean diameter of less than about 2 μm.

4. The composition of claim 3, wherein said average mean diameter is less than about 0.5 μm.

5. The composition of claim 4, wherein said average mean diameter is from about 0.05 μm to about 0.3 μm.

6. The composition of claim 1, wherein said colored pigment comprises carbon, anthraquinones, phthalocyanine blues, phthalocyanine greens, diazos, monoazos, pyranthrones, perylenes, heterocyclic yellows, quinacridones, (thio)indigoids and mixtures thereof.

7. The composition of claim 1, wherein said colored pigment is carbon.

8. The composition of claim 1, wherein the ionic or the ionizable group is a carboxylic acid or a salt thereof.

9. The composition of claim 1, wherein the ionic or the ionizable group is a sulfonic acid or a salt thereof.

10. The composition of claim 1, wherein the organic group is a sulfophenyl group or a salt thereof.

11. The composition of claim 1, wherein the organic group is p-sulfophenyl or a salt thereof.

12. The composition of claim 1, wherein the organic group is p-$C_6H_4SO_3^-Na^+$.

13. The composition of claim 1, wherein the organic group is a carboxyphenyl group or a salt thereof.

14. The composition of claim 1, wherein the organic group is a p-carboxyphenyl group or a salt thereof.

15. The composition of claim 1, wherein the organic group is a p-$C_6H_4CO_2H$ group.

16. The composition of claim 1, wherein the aromatic group is a naphthyl group.

17. The composition of claim 1 wherein the ionic or the ionizable group is a quaternary ammonium salt.

18. The composition of claim 1, wherein the organic group is 3-$C_5H_4N(C_2H_5)^+X^-$, $C_6H_4NC_5H_5^+X^-$, $C_6H_4COCH_2N(CH_3)_3^+X^-$, $C_6H_4COCH_2(NC_5H_5)^+X^-$, 3-$C_5H_4N(CH_3)^+X^-$, $C_6H_4N(CH_3)_3^+X^-$, and $C_6H_4CH_2N(CH_3)_3^+X^-$, wherein $X^-$ is a halide or an anion derived from a mineral or organic acid.

19. The composition of claim 1, wherein the organic group is $pC_6H_4$—$SO^-_3Na^+$, $pC_6H_4$—$CO^-_2Na^+$, or $C_6H_4(NC_5H_5)^+NO_3^-$.

20. The composition of claim 1, wherein the organic group is a carboxy-hydroxy phenyl group or its salt.

21. The composition of claim 1, wherein the organic group is 4-carboxy-3 hydroxy phenyl, 3,4 dicarboxyl phenyl, or salts thereof.

22. The composition of claim 7, wherein the carbon is carbon black, graphite, carbon fiber, vitreous carbon, finely-divided carbon, activated charcoal, activated carbon, or mixtures thereof.

23. The composition of claim 22, wherein the carbon is carbon black.

24. The composition of claim 1, wherein the aromatic ring of the aromatic group is an aryl group.

25. The composition of claim 1, wherein the aromatic ring of the aromatic group is a heteroaryl group.

26. The composition of claim 1, wherein the organic group has one or more groups selected from R, OR, COR, COOR, OCOR, halogen, CN, $NR_2$, $SO_2NR(COR)$, $SO_2NR_2$, $NR(COR)$, $CONR_2$, $NO_2$, $SO_3M$, $SO_3NR_4$, and $N=NR'$; wherein R is independently hydrogen, $C_1$–$C_{20}$ substituted or unsubstituted alkyl, $C_3$–$C_{20}$ substituted or unsubstituted alkenyl, $(C_2$–$C_4$ alkyleneoxy$)_xR''$, or a substituted or unsubstituted aryl; R' is independently hydrogen, $C_1$–$C_{20}$ substituted or unsubstituted alkyl, or a substituted or unsubstituted aryl; R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl; M is H, Li, Na, Cs, or K; and x is an integer ranging from 1–40.

27. The composition of claim 1 wherein the modified colored pigment has further attached to the colored pigment an aromatic group of the formula $A_yAr$—, in which Ar is an aromatic radical selected from the group consisting of phenyl, naphthyl, anthracenyl, phenanthrenyl, biphenyl, pyridinyl and triazinyl;

A is hydrogen, a functional group selected from the group consisting of R, OR, COR, COOR, OCOR, halogen, CN, $NR_2$, $SO_2NR_2$, $SO_2NR(COR)$, $NR(COR)$, $CONR_2$, $NO_2$, $SO_3M$, $SO_3NR_4$, and $N=NR'$; or A is a linear, branched or cyclic hydrocarbon radical, unsubstituted or substituted with one or more of said functional groups;

R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x R''$ or a substituted or unsubstituted aryl;

R' is hydrogen, a $C_1$–$C_{20}$ substituted or unsubstituted alkyl, or a substituted or unsubstituted aryl;

R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or a substituted or unsubstituted aroyl; x is from 1–40;

M is H, Li, Na, Cs, or K; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl.

28. A method to improve waterfastness of an image generated by an aqueous ink composition comprising the steps of: incorporating into said composition a modified colored pigment having attached at least one organic group, the organic group comprising a) at least one aromatic group or a $C_1$–$C_{12}$ alkyl group, and b) at least one ionic group, at least one ionizable group, or a mixture of an ionic group and an ionizable group, wherein the at least one aromatic group or $C_1$–$C_{12}$ alkyl group of the organic group is directly attached to the colored pigment and the organic group is present at a treatment level of from about 0.10 to about 4.0 micromoles/m² of the colored pigment used based on nitrogen surface area of the colored pigment.

29. The method of claim 28, wherein said modified colored pigment has a average mean diameter of less than about 2 μm.

30. The method of claim 29, wherein said average mean diameter is less than about 0.5 μm.

31. The method of claim 30, wherein said average mean diameter is from about 0.05 μm to about 0.3 μm.

32. The method of claim 28, wherein said aqueous ink composition is an ink jet ink composition.

33. The method of claim 28, wherein said colored pigment is carbon.

34. The method of claim 33, wherein said carbon is carbon black, graphite, carbon fiber, vitreous carbon, finely-divided carbon, activated charcoal, activated carbon, or mixtures thereof.

35. The method of claims 34, wherein said carbon is carbon black.

36. An ink jet ink composition comprising an aqueous or non-aqueous vehicle and a colored pigment having attached an organic group having the formula: Ar—$R^1$ or Ar'$R^2R^3$, wherein Ar and Ar' represent an aromatic group, $R^1$ represents an aromatic or aliphatic group containing a hydrophobic group and a hydrophilic group, $R^2$ represents a hydrophilic group, and $R^3$ represents an aromatic or aliphatic group containing a hydrophobic group, wherein said organic group is present at a treatment level of from about 0.10 micromoles/$m^2$ to about 5.0 micromoles/$m^2$ pigment, and wherein an image generated from said ink jet ink composition is waterfast.

37. The composition of claim 36, wherein said modified colored pigment has a average mean diameter of less than about 2 µm.

38. The composition of claim 37, wherein said average mean diameter is less than about 0.5 µm.

39. The composition of claim 38, wherein said average mean diameter is from about 0.05 µm to about 0.3 µm.

40. The ink jet ink composition of claim 36, wherein said colored pigment comprises carbon, anthraquinones, phthalocyanine blues, phthalocyanine greens, diazos, monoazos, pyranthrones, perylenes, heterocyclic yellows, quinacridones, (thio)indigoids and mixtures thereof.

41. The ink jet ink composition of claim 40, wherein said colored pigment is carbon.

42. The ink jet ink composition of claim 41, wherein said carbon is carbon black, graphite, carbon fiber, vitreous carbon, finely-divided carbon, activated charcoal, activated carbon, or mixtures thereof.

43. The ink jet ink composition of claim 42, wherein said carbon is carbon black.

44. The ink jet ink composition of claim 36, wherein $R^1$ has the formula:

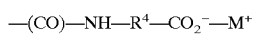

where $R^4$ is a substituted or unsubstituted alkylene group and M is a counterion.

45. The ink jet ink composition of claim 44, wherein said alkylene group is substituted with at least one functional group.

46. The ink jet ink composition of claim 44, wherein said alkylene group is a $C_1$–$C_{15}$ alkylene group.

47. The ink jet ink composition of claim 46, wherein said alkylene group is substituted with at least one functional group.

48. The ink jet ink composition of claim 47, wherein said functional group is a sulfonic acid group, a sulfinic acid group, a phosphonic acid group, a carboxylic acid group, or a salt thereof.

49. The ink jet ink composition of claim 36, wherein said hydrophilic group of $R^2$ or the hydrophilic group in $R^1$, independently of each other, is a sulfonic acid group, a sulfinic acid group, a phosphonic acid group, a carboxylic acid group, or a salt thereof.

50. The ink jet ink composition of claim 49, wherein said hydrophilic group is $SO_3^-$.

51. The ink jet ink composition of claim 44, wherein Ar or Ar' represent a phenyl group, and said $R^4$ is $C_2H_4$, $CH(C_2H_4CO_2^-M^+)$, or $CH_2$.

52. The ink jet ink composition of claim 36, wherein Ar or Ar' represent a phenyl group.

53. The ink jet ink composition of claim 36, wherein Ar or Ar' represent a naphthyl group.

54. The ink jet ink composition of claim 36, wherein said ink jet ink composition has an image dry time of from about 0.1 second to about 10 minutes.

55. The ink jet ink composition of claim 36, wherein said image dry time is about 5 minutes or less.

56. The ink jet ink composition of claim 55, wherein said image dry time is about 1 minute or less.

57. The ink jet ink composition of claim 54, wherein said image dry time is from about 0.1 second to about 10 seconds.

58. The ink jet ink composition of claim 36, wherein said ink jet ink composition has decreased inter-color bleed compared to dye-based ink jet inks.

59. The ink jet ink composition of claim 36, wherein said ink jet ink composition has an average inter-color bleed of from about 1 to about 10 µm.

60. The ink jet ink composition of claim 36, wherein said ink jet ink composition has an average inter-color bleed of about 5 µm or less.

61. The ink jet ink composition of claim 36, wherein said ink jet ink composition has an average inter-color bleed of about 1 µm or less.

62. The ink jet ink composition of claim 36, wherein said ink jet ink composition has an improved optical density compared to a dye-based ink jet ink.

63. The ink jet ink composition of claim 36, wherein said ink jet ink composition has an improved optical density compared to a pigment-based ink jet ink.

64. The ink jet ink composition of claim 36, wherein said ink jet ink composition has an optical density of at least about 1.0.

65. The ink jet ink composition of claim 64, wherein said optical density is at least about 1.25.

66. The ink jet ink composition of claim 65, wherein said optical density is at least about 1.5.

67. The ink jet ink composition of claim 64, wherein said optical density is from about 1.2 to about 1.7.

68. A method to improve waterfastness of an image generated by an ink jet ink composition comprising introducing a colored pigment having attached an organic group having the formula: Ar—$R^1$ or Ar'$R^2R^3$, wherein Ar and Ar' represent an aromatic group, $R^1$ represents an aromatic or aliphatic group containing a hydrophobic group and a hydrophilic group, $R^2$ represents a hydrophilic group, and $R^3$ represents an aromatic or aliphatic group containing a hydrophobic group, and wherein said organic group is present at a treatment level of from about 0.10 micromoles/$m^2$ to about 5.0 micromoles/$m^2$ pigment.

69. The method of claim 68, wherein said modified colored pigment has a average mean diameter of less than about 2 µm.

70. The method of claim 69, wherein said average mean diameter is less than about 0.5 µm.

71. The method of claim 70, wherein said average mean diameter is from about 0.05 µm to about 0.3 µm.

72. A modified pigment comprising a colored pigment having attached at least one organic group, the organic group having the formula: Ar—$R^1$ or Ar'$R^2R^3$, wherein Ar and Ar' represent an aromatic group, $R^1$ represents an aromatic or aliphatic group containing a hydrophobic group and a hydrophilic group, $R^2$ represents a hydrophilic group, and $R^3$ represents an aromatic or aliphatic group containing a hydrophobic group, wherein said organic group is present at a treatment level of from about 0.10 micromoles/m$^2$ to about 5.0 micromoles/m$^2$ colored pigment.

73. The modified colored pigment of claim 72, wherein R$^1$ has the formula —(CO)—NH—R$^4$—CO$_2^-$—M$^+$, wherein R$^4$ is a substituted or unsubstituted alkylene group and M is a counterion.

74. The modified colored pigment of claim 73, wherein said alkylene group is a C$_1$–C$_{15}$ alkylene group.

75. The modified colored pigment of claim 73, wherein R$^4$ is C$_2$H$_4$, CH(C$_2$H$_4$CO$_2^-$M$^+$), or CH$_2$.

76. The modified colored pigment of claim 72, wherein said colored pigment is carbon.

77. The modified colored pigment of claim 76, wherein said colored pigment is carbon black.

* * * * *